United States Patent
Lee et al.

(10) Patent No.: US 11,792,640 B2
(45) Date of Patent: Oct. 17, 2023

(54) METHOD AND DEVICE FOR MANAGING EUICC PROFILE INSTALLATION RIGHTS

(71) Applicant: Samsung Electronics Co., Ltd., Suwon-si (KR)

(72) Inventors: Hyewon Lee, Suwon-si (KR); Sujung Kang, Suwon-si (KR); Jonghan Park, Suwon-si (KR); Duckey Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 68 days.

(21) Appl. No.: 17/310,640

(22) PCT Filed: Feb. 14, 2020

(86) PCT No.: PCT/KR2020/002137
§ 371 (c)(1),
(2) Date: Aug. 13, 2021

(87) PCT Pub. No.: WO2020/167045
PCT Pub. Date: Aug. 20, 2020

(65) Prior Publication Data
US 2022/0030416 A1    Jan. 27, 2022

(30) Foreign Application Priority Data
Feb. 15, 2019    (KR) .................. 10-2019-0017969

(51) Int. Cl.
*H04W 8/20* (2009.01)
*H04W 4/60* (2018.01)
(Continued)

(52) U.S. Cl.
CPC ............ *H04W 8/205* (2013.01); *H04W 4/60* (2018.02); *H04W 12/069* (2021.01); *H04W 12/35* (2021.01)

(58) Field of Classification Search
CPC ..... H04W 8/205; H04W 4/60; H04W 12/069; H04W 12/35; H04W 4/50; H04W 12/40; H04L 63/102
See application file for complete search history.

(56) References Cited

U.S. PATENT DOCUMENTS

| 9,009,475 B2 | 4/2015 | Hauck et al. |
| 11,134,105 B2 | 9/2021 | Park |

(Continued)

FOREIGN PATENT DOCUMENTS

| KR | 10-2017-0074752 A | 6/2017 |
| WO | 2017220154 A1 | 12/2017 |
| WO | 2019015793 A1 | 1/2019 |

OTHER PUBLICATIONS

International Search Report and Written Opinion of the International Searching Authority dated May 20, 2020 in connection with International Application No. PCT/KR2020/002137, 9 pages.

(Continued)

*Primary Examiner* — Mazda Sabouri

(57) ABSTRACT

Provided is a terminal for managing a profile by using an embedded universal integrated circuit card (eUICC) in a wireless communication system. The terminal includes: a transceiver; and at least one processor configured to: receive, from a first server, a command code including event download information for downloading an event related to a profile; perform verification for processing the command code; when the verification is successful, generate a message requesting downloading of the event, by using the event download information, and transmit the same to a second server; and receive, from the second server, the event in response to the message requesting the downloading of the event.

10 Claims, 18 Drawing Sheets

(51) Int. Cl.
   *H04W 12/069*   (2021.01)
   *H04W 12/30*    (2021.01)

(56) References Cited

U.S. PATENT DOCUMENTS

| | | | |
|---|---|---|---|
| 2018/0294949 A1 | 10/2018 | Yang | |
| 2019/0174299 A1* | 6/2019 | Ullah | H04W 8/24 |
| 2020/0128390 A1* | 4/2020 | Lee | H04W 12/06 |
| 2020/0389785 A1* | 12/2020 | Lee | H04W 12/35 |
| 2021/0385635 A1* | 12/2021 | Johansson | H04W 4/70 |

OTHER PUBLICATIONS

3GPP TR 33.899 V1.0.0 (Mar. 2017), Technical Report, 3rd Generation Partnership Project; Technical Specification Group Services and System Aspects; Study on the security aspects of the next generation system (Release 14), Mar. 2017, 471 pages.

GSM Association, SGP.22—RSP Technical Specification, Version 2.2, Sep. 1, 2017, 264 pages.

Korean Intellectual Property Office, "Grounds for Rejection," dated May 23, 2023, in connection with Korean Patent Application No. 10-2019-0017969, 9 pages.

* cited by examiner

METHOD AND DEVICE FOR MANAGING EUICC PROFILE INSTALLATION RIGHTS

CROSS-REFERENCE TO RELATED APPLICATIONS

This application is a 371 National Stage of International Application No. PCT/KR2020/002137, filed Feb. 14, 2020, which claims priority to Korean Patent Application No. 10-2019-0017969, filed Feb. 15, 2019, the disclosures of which are herein incorporated by reference in their entirety.

BACKGROUND

1. Field

The present disclosure relates to a method and apparatus for installing and managing an embedded universal integrated circuit card (eUICC) profile.

2. Description of Related Art

To meet the increase in demand with respect to wireless data traffic after the commercialization of $4^{th}$ generation (4G) communication systems, considerable efforts have been made to develop pre-$5^{th}$ generation (5G) communication systems or 5G communication systems. This is one reason why '5G communication systems' or 'pre-5G communication systems' are called 'beyond 4G network communication systems' or 'post Long-Term Evolution (LTE) systems.' In order to achieve a high data rate, 5G communication systems are being developed to be implemented in a super-high frequency band (millimeter wave (mmWave)), e.g., a band of 60 GHz. In order to reduce the path loss of radio waves in such a super-high frequency band and to increase a transmission distance of radio waves in 5G communication systems, various technologies such as beamforming, massive multiple-input multiple-output (MIMO), full dimensional MIMO (FD-MIMO), array antennas, analog beam-forming, and large-scale antennas have been discussed. In order to improve system networks for 5G communication systems, various technologies have been developed, e.g., evolved small cells, advanced small cells, cloud radio access networks (Cloud-RAN), ultra-dense networks, device-to-device communication (D2D), wireless backhaul, moving networks, cooperative communication, coordinated multi-points (CoMP), and interference cancellation. Also, for 5G communication systems, other technologies have been developed, e.g., hybrid frequency-shift keying (FSK) and quadrature amplitude modulation (QAM) (FQAM) and sliding window superposition coding (SWSC), which are advanced coding modulation (ACM) schemes, and filter bank multi carrier (FBMC), non-orthogonal multiple access (NOMA), and sparse code multiple access (SCMA), which are advanced access schemes.

The Internet has evolved from a human-based connection network, where humans create and consume information, to the Internet of things (IoT), where distributed configurations, such as objects, exchange information with each other to process the information. Internet of everything (IoE) technology is emerging, in which technology related to the IoT is combined with, for example, technology for processing big data through connection with a cloud server. In order to implement the IoT, various technological components are required, such as sensing technology, wired/wireless communication and network infrastructures, service interface technology, security technology, etc. In recent years, technologies including a sensor network for connecting objects, machine to machine (M2M) communication, machine type communication (MTC), etc. have been studied. In the IoT environment, intelligent Internet technology (IT) services may be provided to collect and analyze data obtained from objects connected to each other to create new value in human life. As existing information technology (IT) techniques and various industries converge and combine with each other, the IoT may be applied to various fields, such as smart homes, smart buildings, smart cities, smart cars or connected cars, smart grids, health care, smart home appliances, high quality medical services, etc.

Various attempts are being made to apply 5G communication systems to the IoT network. For example, techniques such as the sensor network, M2M, and MTC are implemented by 5G communication technologies including beamforming, MIMO, and array antenna. The application of cloud radio access network (RAN) as a big data processing technology described above may be an example of convergence of 5G communication technology and IoT technology.

As described above, various services are able to be provided due to the development of mobile communication systems, and thus, there is need for methods of effectively providing such services.

A universal integrated circuit card (UICC) is a smart card inserted into a mobile communication terminal or the like to be used, and is also called a UICC card. The UICC may include an access control module for a terminal to access a network of a mobile communication operator. Examples of the access control module include a universal subscriber identity module (USIM), a subscriber identity module (SIM), and an internet protocol (IP) multimedia service identity module (ISIM). The UICC including the USIM is generally referred to as a USIM card. Similarly, the UICC including the SIM is generally referred to as a SIM card.

Among UICCs, a UICC fixed to a terminal to be used is referred to as an embedded UICC (eUICC), and generally, the eUICC denotes a UICC that is fixed to a terminal to be used and is capable of selecting a SIM by remotely downloading the SIM. Also, downloaded SIM information is referred to as a eUICC profile, or simply, a profile.

SUMMARY

The present disclosure provides an apparatus and method for effectively providing a service in a mobile communication system.

According to an embodiment of the present disclosure, a method and apparatus enabling a terminal to select a communication service and perform a communication connection, in a communication system are provided.

According to an embodiment of the present disclosure, a method and apparatus enabling a terminal to download, via online, install, and manage a profile for a communication connection, in a communication system are provided.

According to an embodiment of the present disclosure, a method and apparatus enabling a terminal to efficiently download an event in a communication system are provided.

According to embodiments, a service can be effectively provided in a mobile communication system.

According to an embodiment of the present disclosure, a server in a communication system is configured to further selectively add a signature while generating event download information or a command code including an event identifier, or is configured to further selectively perform additional authentication while downloading an event, thereby simplifying an inter-server communication procedure and a terminal-server communication procedure.

According to an embodiment of the present disclosure, a terminal in a communication system is configured to further selectively add a signature while requesting event download information or a command code including an event identifier, or determines whether the signature is included when the event download information or command code is received, and when the signature is not included, omits additional authentication, thereby efficiently downloading an event from a profile server and processing the same.

DETAILED DESCRIPTION

Figure 1:
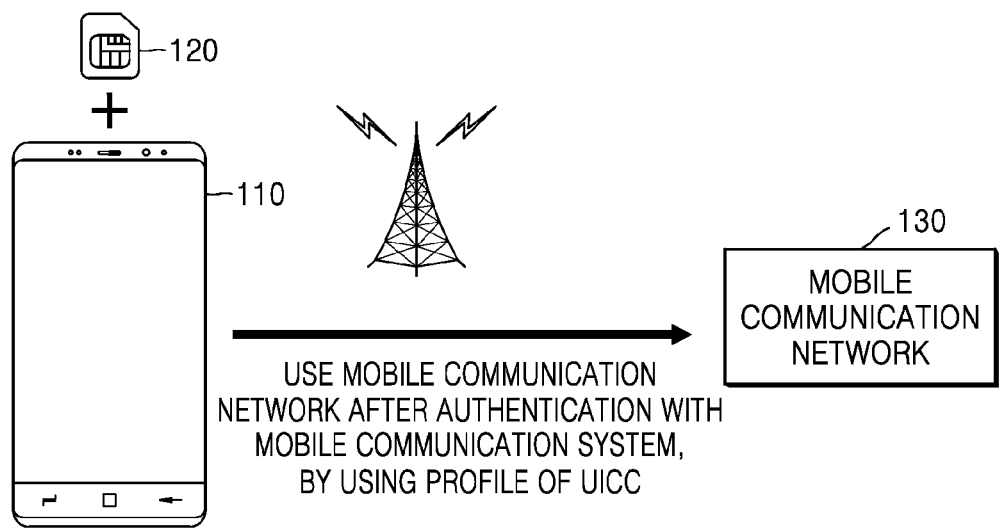
FIG. 1 is a diagram of a method, performed by a terminal, of connecting to a mobile communication network by using a universal integrated circuit card (UICC) on which a fixed profile is mounted, according to an embodiment of the present disclosure.

According to an embodiment of the present disclosure, a terminal for managing a profile by using an embedded universal integrated circuit card (eUICC) in a wireless communication system, includes: a transceiver; and at least one processor configured to: receive, from a first server, a command code including event download information for downloading an event related to a profile; perform verification for processing the command code; when the verification is successful, generating a message requesting downloading of the event by using the event download information, and transmit the same to a second server; and receive, from the second server, the event in response to the message requesting the downloading of the event.

According to another embodiment of the present disclosure, a first server for providing a command code for communication to a terminal in a wireless communication system, includes: a transceiver; and at least one processor configured to: obtain event identification information corresponding to an event related to a profile to be provided to the terminal; generate a command code including event download information for the terminal to download the event, based on the event identification information; and transmit, to the terminal, a signed command code in which a signature is added to the command code or an unsigned command code in which a signature is not added to the command code.

According to another embodiment of the present disclosure, a second server for providing a profile for communication to a terminal in a wireless communication system, includes: a transceiver; and at least one processor configured to: obtain an event related to a profile to be provided to the terminal and event identification information corresponding to the event; receive, from the terminal, a message requesting downloading of the event, in response to a command code obtained by the terminal; verify the message based on the event identification information; and when the verification is successful, transmitting the event to the terminal.

According to another embodiment of the present disclosure, a method performed by a terminal in a wireless communication system, includes: transmitting, to a local profile assistant (LPA) installed in the terminal, a remote subscriber identity module provisioning (RSP) procedure start request message including information about whether an unsigned command code is to be used; transmitting, to a server of a second operator, a command code generation request message including command code generation information, based on the RSP procedure start request message; receiving, from the server of the second operator, a command code in response to the command code generation request message; verifying the command code; transmitting, to a profile server of a first operator, an RSP request message including information about the command code, based on a result of the verifying; and receiving, from the profile server of the first operator, data about a profile, in response to the RSP request message.

The command code generation information may include at least one of information about the terminal or information about an embedded universal integrated circuit card (eUICC) of the terminal.

The command code may be generated, by the server of the second operator, based on identification information of the profile received from a server of the first operator.

The verifying of the command code may include: receiving, from a user of the terminal, an input related to execution of the command code; and verifying the command code, based on the input.

The receiving of, from the server of the second operator, the command code may include receiving the command code from the server of the second operator, by using an application of the second operator installed in the terminal, and the verifying of the command code may include: verifying an access authority of the application of the second operator to access the LPA; transmitting, from the application of the second operator to the LPA, the command code, based on a result of verifying the access authority; and verifying the command code by using the LPA.

The information about whether the unsigned command code is to be used for the RSP procedure may include an indicator indicating that the unsigned command code is to be used for the RSP procedure, and the command code received from the server of the second operator may be the unsigned command code.

According to another embodiment of the present disclosure, a method performed by a profile server in a wireless communication system, includes: receiving, from a server of a communication operator, a remote subscriber identity module provisioning (RSP) procedure preparation request message including information about whether an unsigned command code is to be used for the RSP procedure; obtaining identification information of a profile, based on the RSP procedure preparation request message; transmitting the identification information of the profile to the server of the communication operator; receiving, from a terminal, an RSP request message including information about a command code; verifying the information about the command code, based on the identification information of the profile; and transmitting data about the profile to the terminal, based on a result of the verifying.

The verifying of the information about the command code, based on the identification information of the profile may include verifying the command code according to whether identification information of the command code included in the information about the command code matches the identification information of the profile.

The RSP procedure preparation request message may further include information about whether token verification is required for the RSP procedure, and the verifying of the information about the command code may include verifying the information about the command code, based on whether the token verification is required.

The information about whether the unsigned command code is to be used for the PRS procedure may include an indicator indicating that the unsigned command code is to be used for the RSP procedure, the information about the command code may include information about the unsigned command code, the information about whether the token verification is required for the RSP procedure may include an indicator indicating that the token verification is not required for the RSP procedure, and the verifying of the information about the command code may include verifying only information about the unsigned command code without performing the token verification.

According to another embodiment of the present disclosure, a terminal in a wireless communication system, includes: a transceiver; and at least one processor configured to: transmit, to a local profile assistant (LPA) installed in the terminal, a remote subscriber identity module provisioning (RSP) procedure start request message including information about whether an unsigned command code is to be used; control the transceiver to transmit, to a server of a second operator, a command code generation request message including command code generation information, based on the RSP procedure start request message; control the transceiver to receive, from the server of the second operator, a command code in response to the command code generation request message; verify the command code; control the transceiver to transmit, to a profile server of a first operator, an RSP request message including information about the command code, based on a result of the verifying; and control the transceiver to receive, from the profile server of the first operator, data about a profile, in response to the RSP request message.

According to another embodiment of the present disclosure, a profile server in a wireless communication system, includes: a transceiver; and at least one processor configured to: control the transceiver to receive, from a server of a communication operator, a remote subscriber identity module provisioning (RSP) procedure preparation request message including information about whether an unsigned command code is to be used for the RSP procedure; obtain identification information of a profile, based on the RSP procedure preparation request message; control the transceiver to transmit the identification information of the profile to the server of the communication operator; control the transceiver to receive, from a terminal, an RSP request message including information about a command code; verify the information about the command code, based on the identification information of the profile; and control the transceiver to transmit, to the terminal, data about the profile, based on a result of the verification.

Hereinafter, embodiments of the present disclosure will be described with reference to accompanying drawings.

In describing the embodiments, descriptions of technical contents that are well known in the technical field to which the present disclosure belongs and are not directly related to the present disclosure will be omitted. By omitting the unnecessary description, the gist of the present disclosure may be more clearly conveyed without obscuring the subject matter.

For the same reasons, components may be exaggerated, omitted, or schematically illustrated in drawings for clarity. Also, the size of each component does not completely reflect the actual size. In the drawings, like reference numerals denote like elements.

Advantages and features of the present disclosure and methods of accomplishing the same may be understood more readily by reference to the following detailed description of the embodiments and the accompanying drawings. In this regard, the embodiments of the present disclosure may have different forms and should not be construed as being limited to the descriptions set forth herein. Rather, these embodiments of the present disclosure are provided so that the present disclosure will be thorough and complete and will fully convey the concept of the present disclosure to one of ordinary skill in the art, and the present disclosure will only be defined by the appended claims. Throughout the specification, like reference numerals denote like elements.

Here, it will be understood that combinations of blocks in flowcharts or process flow diagrams may be performed by computer program instructions. Because these computer program instructions may be loaded into a processor of a general-purpose computer, a special purpose computer, or another programmable data processing apparatus, the instructions, which are performed by a processor of a computer or another programmable data processing apparatus, create units for performing functions described in the flowchart block(s). The computer program instructions may be stored in a computer-executable or computer-readable memory capable of directing a computer or another programmable data processing apparatus to implement a function in a particular manner, and thus the instructions stored in the computer-executable or computer-readable memory may also be capable of producing manufacturing items containing instruction units for performing the functions described in the flowchart block(s). The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

In addition, each block may represent a portion of a module, segment, or code that includes one or more executable instructions for executing specified logical function(s). It should also be noted that in some alternative implementations, functions mentioned in blocks may occur out of order. For example, two blocks illustrated successively may actually be executed substantially concurrently, or the blocks may sometimes be performed in a reverse order according to the corresponding function.

Here, the term "unit" used in the embodiments means a software component or hardware component such as a field-programmable gate array (FPGA) or an application-specific integrated circuit (ASIC), and performs a specific function. However, the term "unit" is not limited to software or hardware. The "unit" may be formed so as to be in an addressable storage medium, or may be formed so as to operate one or more processors. Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with the smaller number of components and "units", or may be divided into additional components and "units". Furthermore, the components and "units" may be embodied to reproduce one or more central processing units (CPUs) in a device or security multimedia card.

Specific terms used in the description below are provided in order to help understanding the present disclosure, and the specific terms may be changed to other forms within a range of the technical idea of the present disclosure.

In the present disclosure, a universal integrated circuit card (UICC) is a smart card inserted into a mobile communication terminal or the like to be used, and is also called a UICC card.

The UICC denotes a chip that stores personal information, such as network access authentication information, a telephone directory, and a short message service (SMS) of a mobile communication subscriber, and enables safe mobile communication usage by performing subscriber authentication and traffic security key generation when accessing a mobile communication network, such as global system for mobile communications (GSM), wideband code division multiple access (WCDMA), or long-term evolution (LTE).

The UICC may include a communication application or an access control module for a terminal to access a network of a mobile communication operator. Examples of the communication application or access control module include a universal subscriber identity module (USIM), a subscriber identity module (SIM), and an internet protocol (IP) multimedia service identity module (ISIM). Also, the UICC may provide a higher-level security function for mounting of various applications, such as an electronic wallet, ticketing, and an electronic passport.

The UICC including the USIM may also be generally referred to as a USIM card. Similarly, the UICC including the SIM may also be generally referred to as a SIM card.

In the present disclosure, a "SIM card", a "UICC", a "USIM card", or an "UICC including an ISIM" may be used in a same meaning. In other words, the content of the present disclosure may be equally applied to a SIM card, a USIM card, an ISIM card, or a general UICC.

A SIM card stores personal information of a mobile communication subscriber and enables safe mobile communication usage by performing subscriber authentication and traffic security key generation when accessing a mobile communication network.

Generally, the SIM card is manufactured as a dedicated card for a specific mobile communication operator according to a request of the corresponding operator, and is released with authentication information for accessing a network of the corresponding operator, for example, a USIM application and an international mobile subscriber identity (IMSI), a K value, and an OPc value, being pre-mounted thereon. Accordingly, the SIM card is supplied by the mobile communication operator and provided to a subscriber, and thereafter, may perform management, such as installation, modification, or deletion, of an application in an UICC by using a technology such as over-the-air (OTA) when necessary. The subscriber is able to use the network of the mobile communication operator and an application service by inserting the UICC into a mobile communication terminal owned by the subscriber, and when replacing a terminal, may move the UICC from an existing terminal to a new terminal, thereby using authentication information, a mobile communication phone number, and a personal telephone directory stored in the UICC, in the new terminal.

However, the SIM card is inconvenient for a user of the mobile communication terminal to receive a service of another mobile communication operator. It may be inconvenient for the user of the mobile communication terminal to physically obtain the SIM card to receive the service from the mobile communication operator. For example, there is an inconvenience of purchasing a local SIM card to receive a local mobile communication service when traveling in another country. A roaming service somewhat solves the inconvenience, but fees are relatively expensive and the service may not be received when there is no contract between mobile operators.

Such inconveniences may be considerably resolved when a SIM is remotely downloaded and installed in the UICC. In other words, the user may download, to the UICC, a SIM of a mobile communication service to be used at a desired time. Such a UICC may be used by downloading and installing a plurality of SIMs and selecting one of the SIMs. The UICC may be fixed or not fixed to a terminal. In particular, a UICC fixed to a terminal to be used is referred to as an embedded UICC (eUICC), and generally, the eUICC denotes a UICC fixed to a terminal to be used and capable of selecting a SIM by remotely downloading the SIM. In the present disclosure, a UICC capable of remotely downloading and selecting an SIM is referred to as a eUICC. In other words, among UICCs capable of remotely downloading and selecting a SIM, a UICC that is fixed or not fixed to a terminal is integrally referred to as a eUICC. Also, downloaded SIM information is referred to as a eUICC profile, and simply, a profile.

In the present disclosure, a eUICC is a security module in a form of a chip embedded in a terminal, not in a detachable form capable of being inserted into and detached from the terminal. The eUICC may be installed by downloading a profile using an OTA technology. The eUICC may be referred to as a UICC capable of downloading and installing a profile.

In the present disclosure, a method of downloading and installing a profile in an eUICC by using an OTA technology may also be applied to a detachable UICC capable of being inserted into or detached from a terminal. In other words, an embodiment of the present disclosure may be applied to a UICC capable of downloading and installing a profile by using an OTA technology.

In the present disclosure, a UICC and a SIM may be interchangeably used, and a eUICC and an eSIM may be interchangeably used.

In the present disclosure, a profile may denote an application, file system, or an authentication key value stored in a UICC, which is packaged in a form of software.

In the present disclosure, a USIM profile may have a same meaning as a profile or may denote information included in a USIM application in a profile, which is packaged in a form of software.

In the present disclosure, an operation of a terminal enabling a profile may denote an operation of changing a state of the profile to an enabled state such that the terminal is able to receive a communication service via a mobile operator that provided the profile. The profile in the enabled state may be referred to as an enabled profile.

In the present disclosure, an operation of a terminal disabling a profile may denote an operation of changing a state of the profile to a disabled state such that the terminal is unable to receive a communication service via a mobile operator that provided the profile. The profile in the disabled state may be referred to as a disabled profile.

In the present disclosure, an operation of a terminal deleting a profile may denote an operation of changing a state of the profile to a deleted state such that the terminal is no longer able to enable or disable the profile. The profile in the deleted state may be referred to as a deleted profile.

In the present disclosure, an operation of a terminal enabling, disabling, or deleting a profile may denote an operation in which a state of the profile is not immediately changed to an enabled state, a disabled state, or a deleted state, but is first marked as a to-be-enabled state, a to-be-disabled state, or a to-be-deleted state, and is changed to the enabled state, the disabled state, or the deleted state after the terminal or a UICC of the terminal performs a specific operation (for example, a refresh or reset command). An operations marking a specific operation as a to-be-state (for example, a to-be-enabled state, a to-be-disabled state, or a to-be-deleted state) is not necessarily limited to marking one to-be-state for one profile, and it is possible to mark one or more profiles as a same or different to-be-state, mark one profile as one or more to-be-states, or mark one or more profiles as same or different one or more to-be-states.

Also, when the terminal marks an arbitrary profile as one or more to-be-states, two to-be-state marks may be integrated into one. For example, when the arbitrary profile is marked as a to-be-disabled state and a to-be-deleted state, the profile may be integrally marked as to-be-disabled and deleted state.

An operation of the terminal marking a to-be-state for one or more profiles may be performed sequentially or simultaneously. Also, an operation of the terminal marking a to-be-state for one or more profiles and then actually changing states of the profiles may be performed sequentially or simultaneously.

In the present disclosure, a profile providing server may include a function of generating a profile, encoding a generated profile, generating a profile remote management instruction, or encoding a generated profile remote management instruction. The profile providing server may be referred to as subscription manager data preparation (SM-DP), subscription manager data preparation plus (SM-DP+), an off-card entity of profile domain, a profile encryption server, a profile generation server, a profile provisioner (PP), a profile provider, or a profile provisioning credentials (PPC) holder.

In the present disclosure, a profile managing server may include a function of managing a profile. The profile managing server may be referred to as subscription manager secure routing (SM-SR), subscription manager secure routing plus (SM-SR+), an off-card entity of eUICC profile manager, a profile management credentials (PMC) holder, an eUICC manager (EM), or a profile manager (PP).

In the present disclosure, the profile providing server may also include a function of the profile managing server. Thus, according to various embodiments of the present disclosure, an operation of the profile providing server may be performed by the profile managing server. Similarly, an operation of the profile managing server or SM-SR may be performed by the profile providing server.

In the present disclosure, a subscription mediating server may be referred to as a subscription manager discovery service (SM-DS), a DS, a root SM-DS, or an alternative SM-DS. The subscription mediating server may receive, from one or more profile providing servers or subscription mediating server, a register event request (event register request). One or more subscription mediating servers may be complexly used, and in this case, a first subscription mediating server may receive an event register request not only from a profile providing server, but also a second subscription mediating server.

In the present disclosure, the profile providing server and the subscription mediating server may be referred to as a remote SIM provisioning (RSP) server. The RSP server may be referred to as a subscription manager XX (SM-XX).

In the present disclosure, a terminal may be referred to as a mobile station (MS), a user equipment (UE), a user terminal (UT), a wireless terminal, an access terminal (AT), a terminal, a subscriber unit, a subscriber station (SS), a wireless device, a wireless communication device, a wireless transmit/receive unit (WTRU), a mobile node, a mobile, or another term. According to an embodiment, examples of the terminal include not only a cellular phone, a smart phone having a wireless communication function, a personal digital assistant (PDA) having a wireless communication function, a wireless modem, a portable computer having a wireless communication function, an imaging apparatus, such as a digital camera, having a wireless communication function, a gaming device having a wireless communication function, a music storage and reproduction home appliance having a wireless communication function, and an Internet home appliance capable of wireless Internet access and browsing, but also portable units or terminals in which combinations of such functions are integrated. The terminal may also include a machine-to-machine (M2M) terminal or a machine type communication (MTC) terminal/device, but is not limited thereto. In the present disclosure, the terminal may also be referred to as an electronic device.

In the present disclosure, a UICC capable of downloading and installing a profile may be embedded in an electronic device. When the UICC is not embedded in the electronic device, the UICC physically separated from the electronic device may be inserted into and connected to the electronic device. For example, the UICC may be inserted into the electronic device in a form of a card. The electronic device may include a terminal, and at this time, the terminal may be a terminal including the UICC capable of downloading and installing a profile. The UICC is able to be embedded in the terminal, and when the terminal and the UICC are separated, the UICC may be inserted into the terminal to be connected to the terminal. The UICC capable of downloading and installing a profile may be referred to as, for example, a eUICC.

In the present disclosure, the terminal or the electronic device may include software or application installed therein to control the UICC or eUICC. The software or application installed in the terminal or electronic device to control the UICC or eUICC may be referred to as, for example, a local profile assistant (LPA).

In the present disclosure, a profile delimiter may be referred to as a factor matching a profile identifier (ID), an integrated circuit card ID (ICCID), a matching ID, an event ID, an activation code, an activation code token, a command code, a command code token, a signed command code, an unsigned command code command code, or ISD-P or profile domain (PD). The profile ID may indicate an intrinsic ID of each profile. The profile delimiter may further include an address of a profile providing server (SD-DP+) capable of indexing a profile. The profile delimiter may further include a signature of the profile providing server (SM-DP+).

In the present disclosure, a eUICC ID may be an intrinsic ID of a eUICC embedded in a terminal, and may be referred to as an EID. When a provisioning profile is pre-mounted on the eUICC, the eUICC ID may be a profile ID of the provisioning profile. Also, in an embodiment of the present disclosure, when the terminal and a eUICC chip are not separated, the eUICC ID may be a terminal ID. The eUICC ID may refer to a specific security domain of the eUICC chip.

In the present disclosure a profile container may be referred to as a profile domain. The profile container may be a security domain.

In the present disclosure, an application protocol data unit (APDU) may be a message for a terminal to interwork with a eUICC. Also, the APDU may be a message for a profile provider (PP) or a profile manager (PM) to interwork with the eUICC.

In the present disclosure, profile provisioning credentials (PPC) may be a method used for mutual authentication, profile encryption, and signature between a profile providing server and the eUICC. The PPC may include one or more of a symmetric key, a Rivest Shamir Adleman (RSA) certificate and private key, an elliptic curved cryptography (ECC) certificate and private key, and a root certification authority (CA) and certificate chain. When there are a plurality of profile providing servers, different PPCs may be stored in the eUICC or used for each of the plurality of profile providing servers.

In the present disclosure, profile management credentials (PMC) may be a method used for mutual authentication, transmit data encryption, and signature between a profile managing server and a eUICC. The PMC may include one or more of a symmetric key, an RSA certificate and private key, an ECC certificate and private key, a root CA and certificate chain. When there are a plurality of profile managing servers, different PMCs may be stored in the eUICC or used for each of the plurality of profile managing servers.

In the present disclosure, an AID may denote an application identifier. A value thereof may be a delimiter for distinguishing different applications in a eUICC.

In the present disclosure, an event may be a term integrally referring to profile download, remote profile management, another profile or eUICC management/process instructions. The event may be named as a remote SIM provisioning operation (RSP operation) or event record, and each event may be referred to as data including at least one of a corresponding event ID (EventID) or matching ID (MatchingID), an address (fully qualified domain name (FQDN), IP address, or uniform resource locator (URL)) of a profile providing server (SM-DP+) or subscription mediating server (SM-DS) where the event is stored, a signature of the profile providing server (SM-DP+) or subscription mediating server (SM-DS), and a digital certificate of the profile providing server (SM-DP+) or subscription mediating server (SM-DS).

Data corresponding to the vent may be referred to as a command code. A part or all of a procedure using the command code may be referred to as a command code processing procedure, a command code procedure, or a local profile assistant (LPA) application programming interface (API). Profile download and profile installation may be interchangeably used.

An event type may be used as a term indicating whether a certain event is profile download, remote profile management (for example, deletion, enablement, disablement, replacement, or update), or another profile or eUICC management/process command, and an operation type may be named as an operation class, an event request type, an event class, or an event request class. An arbitrary event ID (EventID or MatchingID) may assign a path or a purpose of use (EventID source or MatchingID source) a terminal obtained the event ID (eventID or MatchingID).

In the present disclosure, a profile package may be interchangeably used with a profile or may be used as a term indicating a data object of a specific profile, and may be named as a profile tag, length, value (TLV) or profile package TLV. When the profile package is encoded by using an encryption parameter, the profile package may be named as a protected profile package (PPP) or PPP TLV. When the profile package is encoded by using an encryption parameter decodable only by a specific eUICC, the profile package may be named as a bound profile package (BPP) or a BPP TLV. The profile package TLV may be a data set expressing information configuring a profile in a form of TLV.

In the present disclosure, local profile management (LPM) may be named as profile local management, local management, local management command, local command, LPM package, profile local management package, local management package, local management command package, or a local command package. The LPM may be used to change a state (enabled, disabled, or deleted) of a specific profile, or change (update) content (for example, a profile nickname) of a specific profile or abstract information (profile metadata) of a profile, via software or the like installed in a terminal. The LPM may include one or more local management commands, and in this case, profiles subject to the local management commands may be the same or different for each local management command.

In the present disclosure, remote profile management (RPM) may be named as profile remote management, remote management, remote management command, remote command, RPM package, profile remote management package, remote management package, remote management command package, or remote command package. The RPM may be used to change a state (enabled, disabled, or deleted) of a specific profile or change (update) content (for example, a profile nickname) of a specific profile or abstract information (profile metadata) of a profile. The RPM may include one or more remote management commands, and in this case, profiles subject to the remote management commands may be the same or different for each remote management command.

In the present disclosure, a certificate or digital certificate may indicate a digital certificate used for mutual authentication based on an asymmetric key including a pair of a public key (PK) and a secret key (SK). Each certificate may include one or more PKs, a PK ID corresponding to each PK, an ID of a certificate issuer (CI) that issued the corresponding certificate, and a digital signature.

The CI may be named as a certification issuer, a certificate authority (CA), or a certification authority.

In the present disclosure, a PK and a PK ID may be interchangeably used as a meaning indicating a storage space for a specific PK or a certificate including the specific PK, a part of a specific PK or a part of a certificate including the specific PK, an operation result (for example, a hash value) of a specific PK or an operation result (for example, a hash value) of a certificate including the specific PK, an operation result (for example, a hash value) of a part of a specific PK or an operation result (for example, a hash value) of a part of a certificate including the specific PK, or data.

In the present disclosure, when certificates (primary certificates) issued by one CI are used to issue another certificate (secondary certificate) or secondary certificates are used to connectionally issue ternary or higher certificates, a corresponding relationship between the certificates may be named as a certificate chain or a certificate hierarchy, and at this time, a CI certificate used to issue an initial certificate may be named as a root of certificate, highest certificate, root CI, root CI certificate, root CA, or root CA certificate.

In the present disclosure, a mobile operator may indicate a business that provides a communication service to a terminal, and may collectively refer to all of a business supporting system (BSS), operational supporting system (OSS), point of sale (POS) terminal, and other IT systems of the mobile operator. Also, in the present disclosure, the mobile operator is not limited to representing only one of specific businesses providing a communication service, and may be used as a term referring to a group or association (or consortium) of one or more businesses or a representative representing the group or association. In the present disclosure, the mobile operator may be named as an operator (or OP or Op.), a mobile network operator (MNO), a mobile virtual network operator (MVNO), a service provider (SP), or a profile owner (PO), and each mobile operator may be configured or assigned with at least one of a name and/or a unique identifier (object identifier (OID)) of the mobile operator. When the mobile operator refers to a group or association of one or more businesses or a representative, a name or intrinsic ID of the group or association, or the representative may be a name or intrinsic ID shared by all businesses belonging to the group or association, or all businesses cooperating with the representative.

In the present disclosure, AKA denotes authentication and key agreement, and may indicate an authentication algorithm for accessing a network of 3GPP and 3GPP2.

In the present disclosure, K denotes an encryption key value stored in a eUICC used for an AKA authentication algorithm.

In the present disclosure, OPc is a parameter value that may be stored in the eUICC used for the AKA authentication algorithm.

In the present disclosure, NAA denotes a network access application, and may be an application program, such as a USIM or ISIM, stored in a UICC and used to access a network. NAA may be a network access module.

In the present disclosure, an indicator may be used to represent necessity or unnecessity of an arbitrary function, setting, or operation, or may be used to represent the function, setting, or operation itself. Also, in the present disclosure, the indicator may be expressed in various forms, such as an alphanumeric string, a Boolean (true or false), a bitmap, and an array, and may be interchangeably used with other expressions having a same meaning.

Hereinafter, a method and apparatus for installing and managing a eUICC profile of the present disclosure will be described with reference to FIGS. 1 through 12.

FIG. 1 is a diagram of a method, performed by a terminal, of connecting to a mobile communication network by using a UICC on which a fixed profile is mounted, according to an embodiment of the present disclosure.

As shown in FIG. 1, a UICC 120 may be inserted into a terminal 110. For example, the UICC 120 may be a detachable type or may be pre-embedded in the terminal.

A fixed profile of the UICC where the fixed profile is mounted indicates that "access information" for accessing a specific mobile operator is fixed. For example, the access information may be an IMSI that is a subscriber delimiter and a K or Ki value required to authenticate a network, together with the subscriber delimiter.

The terminal 110 according to various embodiments may perform authentication with an authentication processing system (for example, a home location register (HLR) or AuC) of a mobile communication operator, by using the UICC 120. For example, an authentication process may be an AKA process. When the authentical is successful, the terminal may use a mobile communication service, such as a phone call or mobile data, by using a mobile communication network 130 of a mobile communication system.

Figure 2A:
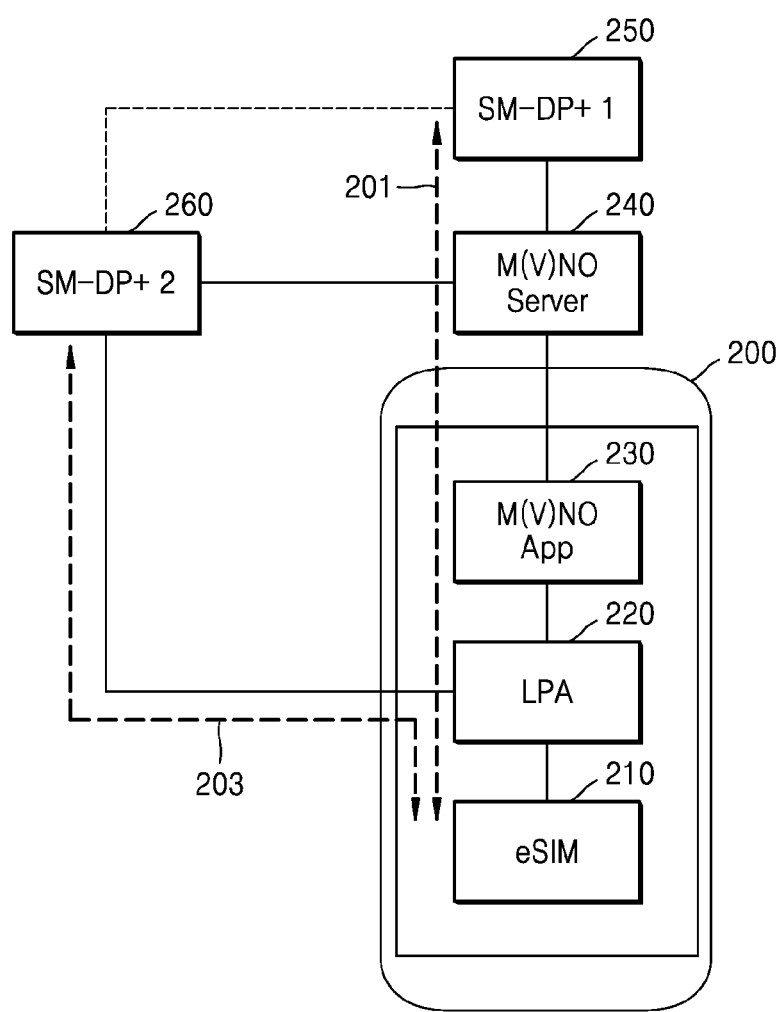
FIG. 2A is a diagram showing a configuration of a system in which a terminal generates a command code signed by a first profile server via an application installed in the terminal, and downloads an event from a second profile server, according to an embodiment of the present disclosure.
Figure 2B:
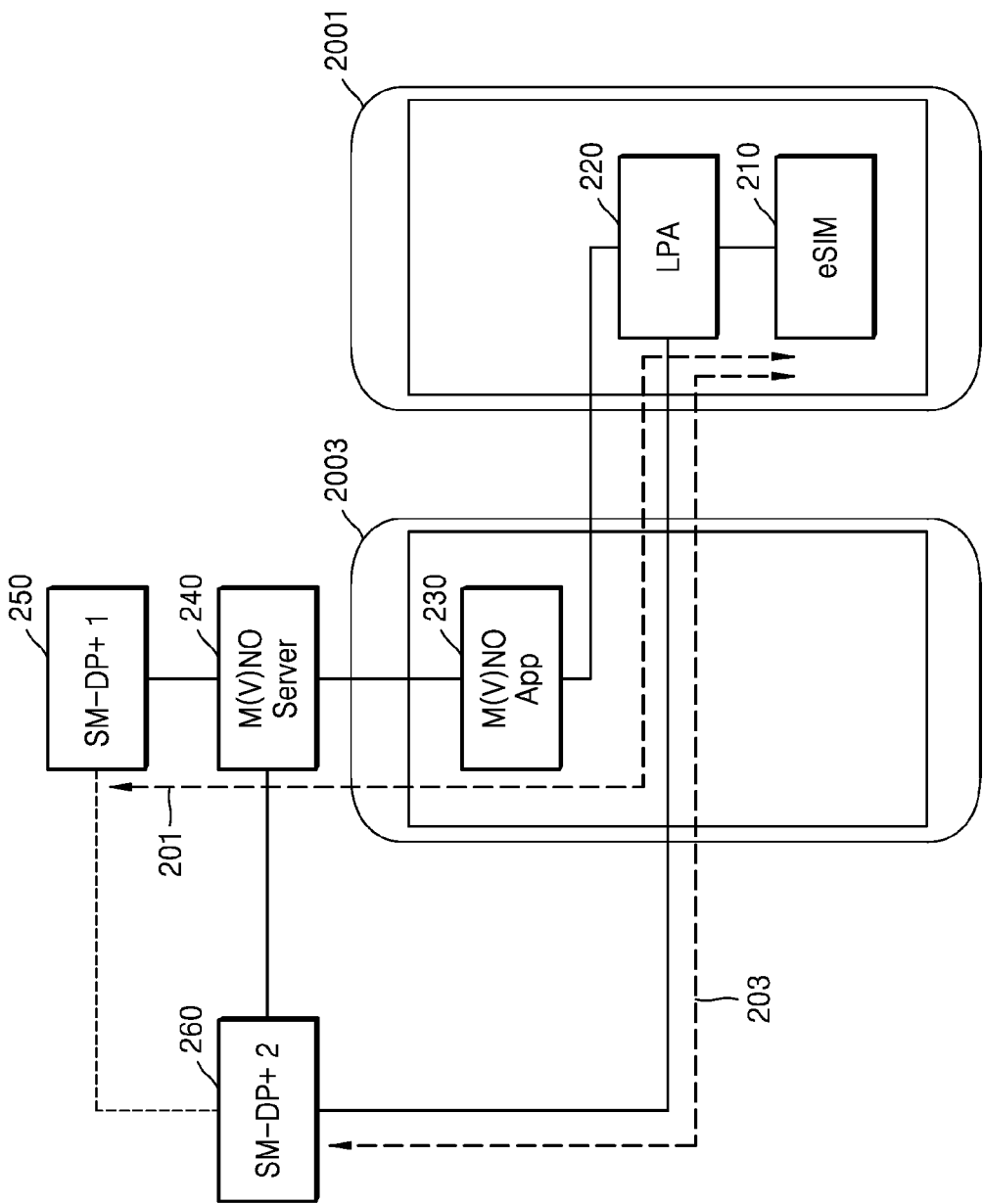
FIG. 2B is a diagram showing a configuration of a system in which a terminal downloads an event by using an operator application installed in another terminal different from the above terminal, according to an embodiment of the present disclosure.
Figure 2C:
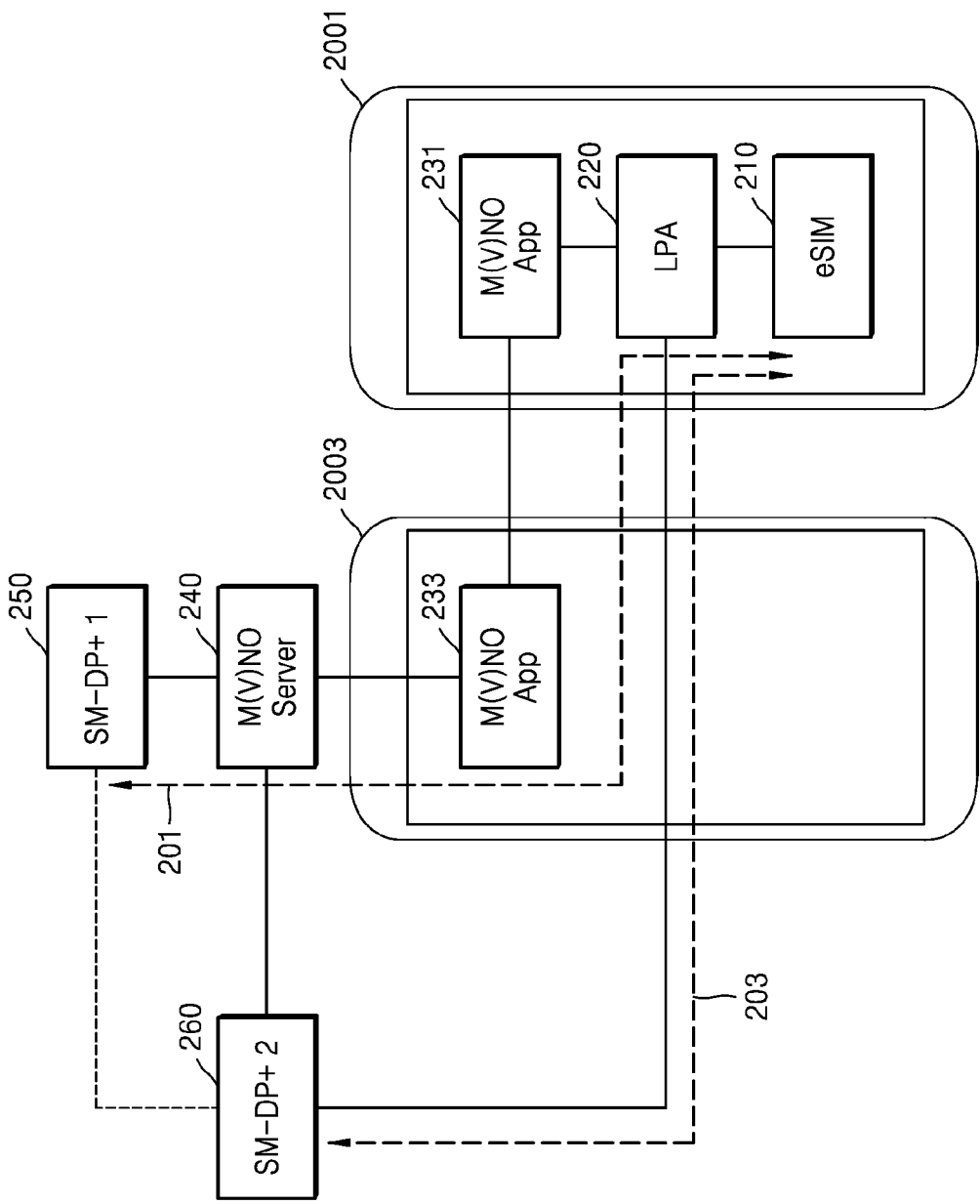
FIG. 2C is a diagram showing a configuration of a system in which a terminal downloads an event by using an operator application installed in another terminal different from the above terminal, according to an embodiment of the present disclosure.
Figure 2D:
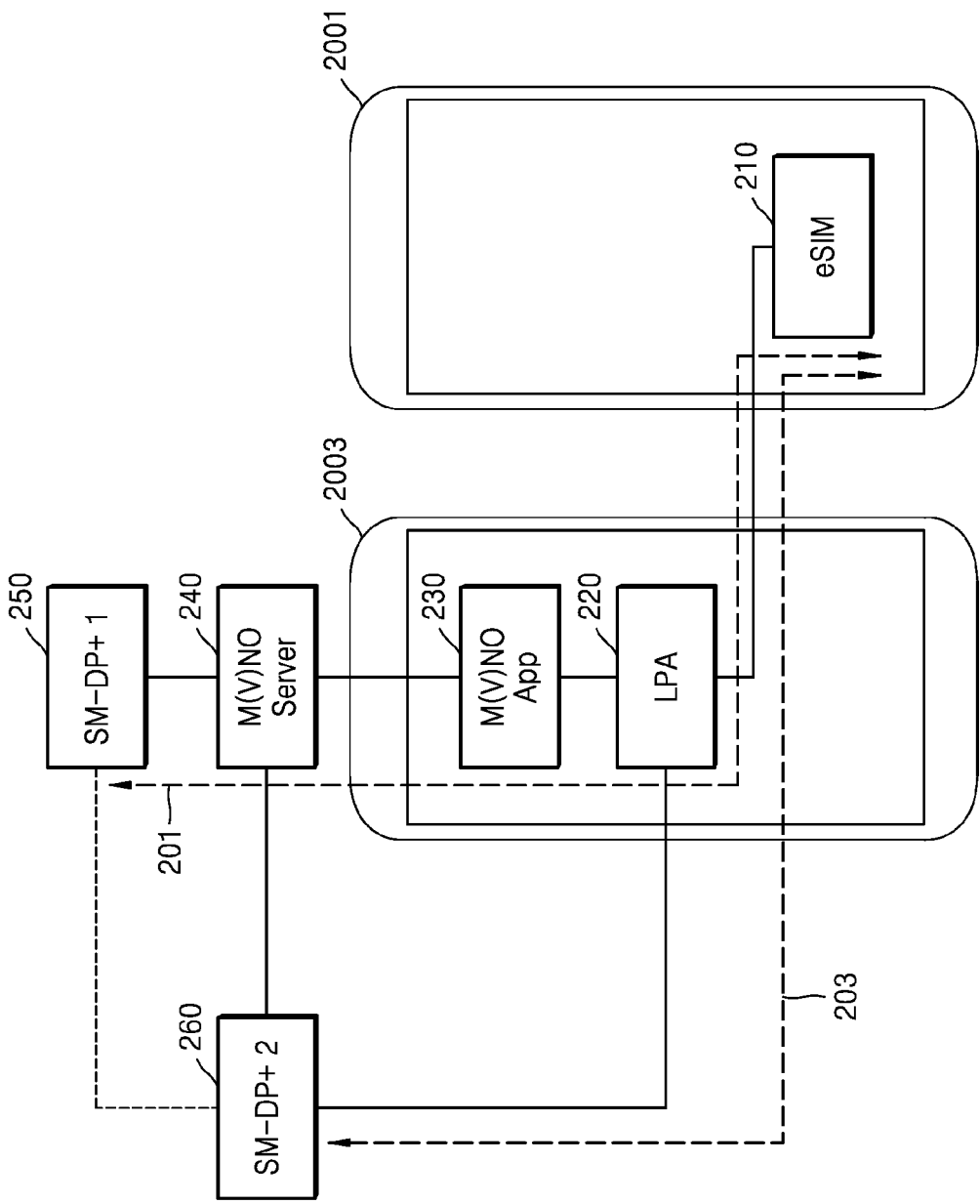
FIG. 2D is a diagram showing a configuration of a system in which a terminal downloads an event by using an operator application installed in another terminal different from the above terminal, according to an embodiment of the present disclosure.
Figure 2E:
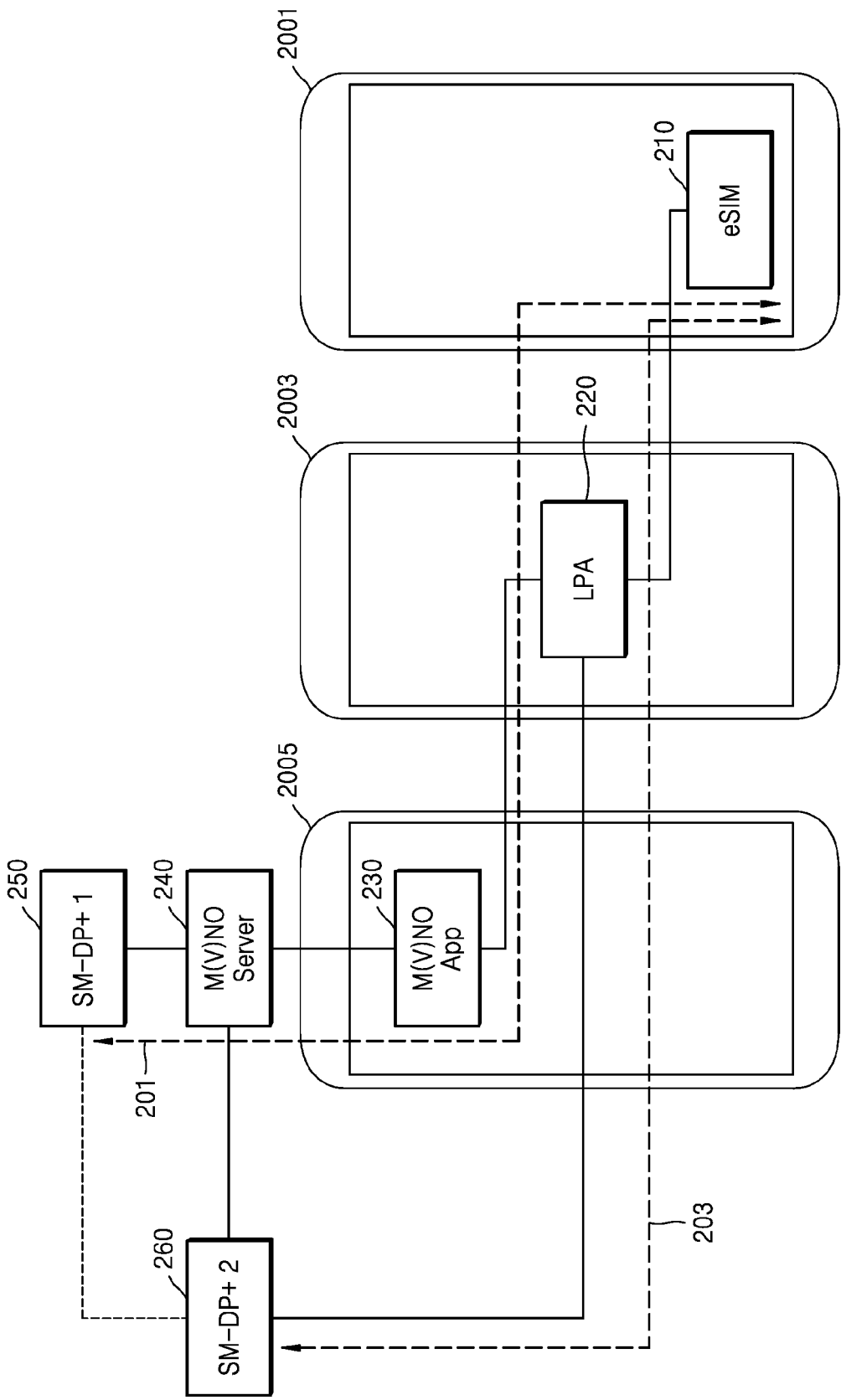
FIG. 2E is a diagram showing a configuration of a system in which a terminal downloads an event by using an operator application installed in another terminal different from the above terminal, according to an embodiment of the present disclosure.

FIG. 2A is a diagram showing a configuration of a system in which a terminal generates a command code signed by a first profile server via an application installed in the terminal, and downloads an event from a second profile server, according to an embodiment of the present disclosure.

As shown in FIG. 2A, an eSIM 210 may be mounted on a terminal 200, and a profile (not shown) may be installed in the eSIM 210. Also, an LPA 220 may be installed in the terminal 200. The eSIM 210 may be controlled by the LPA 220. The eSIM 210 and the LPA 220 may be eSIM/LPA supporting a function for verifying a signature of a command code (verify command code request and response messages), or may be eSIM/LPA not supporting the function. An eSIM and LPA supporting a function for verifying a signature of a command code may be, for example, a version 3 eSIM (v3 eSIM) and a version 3 LPA (v3 LPA), respectively. An eSIM and LPA not supporting a function for verifying a signature of a command code may be, for example, a version 2 eSIM (v2 eSIM) and a version 2 LPA (v2 LPA), respectively.

An application (hereinafter, an operator application 230) of an arbitrary mobile operator may be further installed in the terminal 200. The operator application 230 may be connected to the LPA 220 and a server (hereinafter, an operator server or service operator 240) of the arbitrary mobile operator. Also, for convenience, FIG. 2A illustrates that only one operator application 230 is installed in the terminal and one operator server 240 is connected, but according to an embodiment, one or more operator applications 230 may be installed in the terminal or one or more operator servers 240 may be included. It should be noted that such various configurations of terminals and servers may be briefly displayed by single operator application and single operator server in the following drawings. With respect to the v2 LPA, it is not possible to verify a signature of a command code, but there may be, for example, a version 2.x LPA (v2.x LPA) capable of performing an operator application and command code procedure. The v2.x LPA may be represented as, for example, v2+alpha LPA (v2+a LPA). The v2 LPA may be updated to the v2.x LPA as a command code procedure proceeding function is added via software update, after the release of a terminal.

Meanwhile, in FIG. 2A, the eSIM 210, LPA 220, and operator application 230 are all installed in the same terminal 200, but according to various embodiments, the components may be included in one or more configurations or installed in different terminals. For example, referring to FIG. 2B, the eSIM 210 and LPA 220 may be installed in a first terminal 2001, and the operator application 230 may be installed in a second terminal 2003. For example, referring to FIG. 2C, the eSIM 210, the LPA 220, and a first operator application 231 may be installed in the first terminal 2001, and a second operator application 233 may be installed in the second terminal 2003, wherein the first operator application 231 and the second operator application 233 may be applications of the same or different mobile operators. The first operator application 231 and the second operator application 233 shown in FIG. 2C may each be an embodiment of the operator application 230, and the expressions "first" and "second" are only used to indicate that operator applications are physically installed in different terminals. For example, referring to FIG. 2D, the eSIM 210 may be installed in the first terminal 2001, and the LPA 220 and operator application 230 may be installed in the second terminal 2003. For example, referring to FIG. 2E, the eSIM 210 may be installed in the first terminal 2001, the LPA 220 may be installed in the second terminal 2003, and the operator application 230 may be installed in a third terminal 2005. It should be noted that various configurations of the terminal 200, eSIM 210, LPA 220, and operator application 230 are briefly displayed as one terminal in FIG. 2A and the following drawings. In other words, the first terminal 2001 and the second terminal 2003 shown in FIGS. 2B through 2E, and the third terminal 2005 shown in FIG. 2E may each be an embodiment of the terminal 200, and the expressions "first", "second", and "third" are used only to indicate that terminals are physically different terminals.

The operator server 240 may be connected to a first profile server 250 and a second profile server 260, and the LPA 220 may be connected to the second profile server 260. Here, the first profile server 250 and the second profile server 260 may be the same as or different from each other. Also, when one or more operator servers are included in the configuration, each operator server may be connected to a separate profile server or at least one operator server may be connected to a same profile server. Hereinafter, an operator server and a profile server connected to the operator server may be collectively referred to as an operator domain (MNO domain or MVNO domain). Also, in FIGS. 2A through 2E, for convenience, the first profile server and the second profile server 250 and 260 are each illustrated as single server, but according to an embodiment, one or more profile servers (SM-DP+) may be included in a server configuration or one or more subscription mediating servers (SM-DS) assisting establishment of a connection between a specific profile server and a terminal may be included in the server configuration. It should be noted that such various server configurations may be briefly displayed as single profile server in the following drawings.

Referring to FIG. 2A, in operation 201, the operator application 230 may generate and verify a command code. A procedure of generating and verifying the command code may a procedure further including the eSIM 210, LPA 220, operator server 240, the first profile server 250, and a user (not shown), in addition to the operator application 230.

In operation 203, the LPA 220 may perform an RSP operation by using the generated command code. A procedure of performing the RSP operation may further include the eSIM 210, the second profile server 260, and the user, in addition to the LPA 220.

Detailed operations and message exchange procedures of the terminal 200, eSIM 210, LPA 220, operator application 230, operator server 240, first and second profile servers 250 and 260, and the user, according to an embodiment of the present disclosure, will be described in detail below with reference to the drawings.

Figure 3:
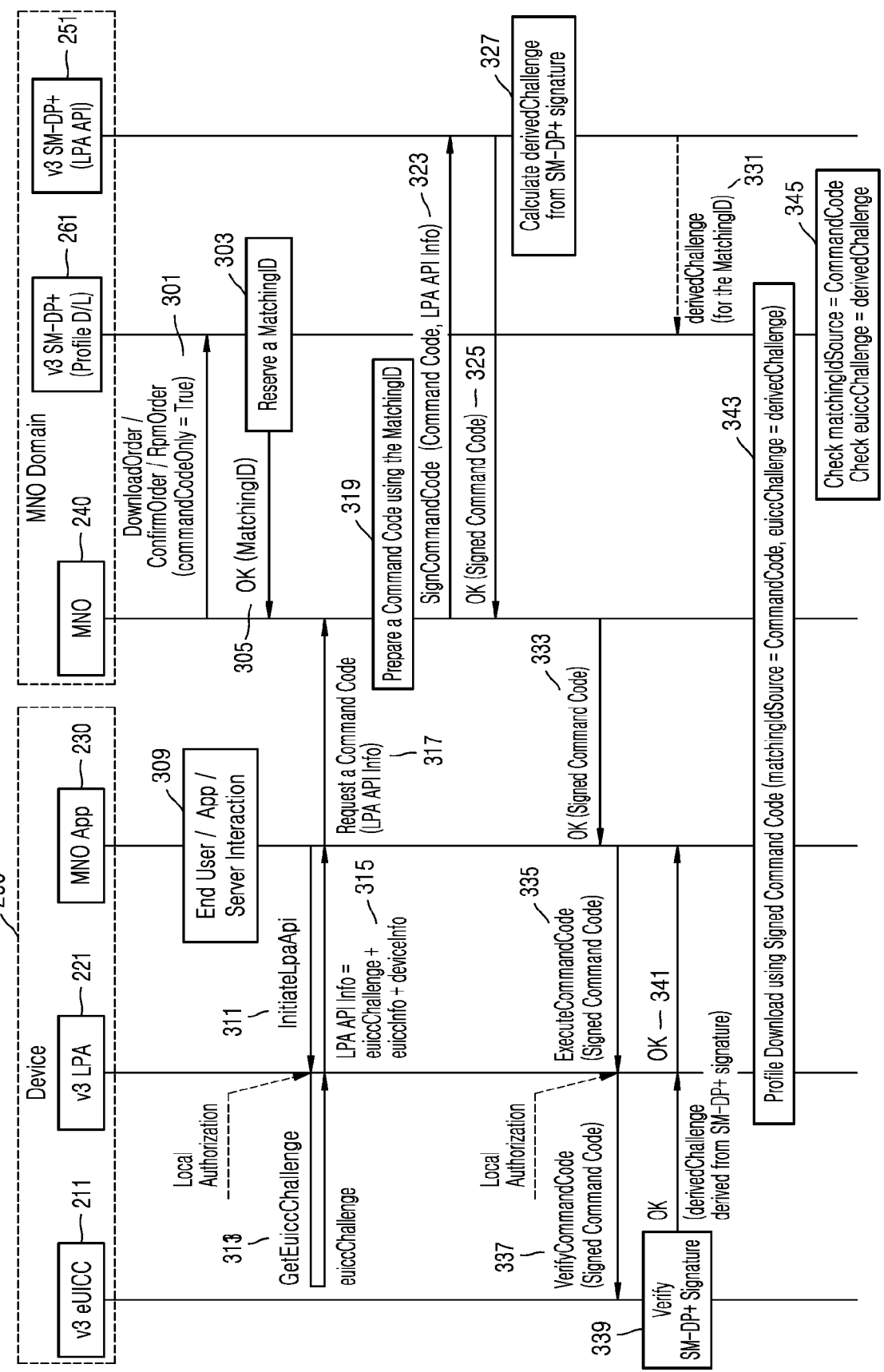
FIG. 3 is a diagram showing procedures in which a terminal generates a command code signed by a first profile server of a first operator, via an application of the first operator installed in the terminal, and downloads an event from a second profile server of the first operator, according to an embodiment of the present disclosure.

FIG. 3 is a diagram showing procedures in which a terminal generates a command code signed by a first profile server of a first operator, via an application of the first operator installed in the terminal, and downloads an event from a second profile server of the first operator, according to an embodiment of the present disclosure.

FIG. 2A will be referred to for descriptions about configurations of an eUICC 211, an LPA 221, the operator application 230, the operator server 240, a first profile server 251, and a second profile server 261 of FIG. 3. For example, the eUICC 211, the LPA 221, the first profile server 251, and the second profile server 261 may respectively correspond to the eSIM 210, the LPA 220, the first profile server 250, and the second profile server 260 of FIG. 2A. The eUICC 211 and the LPA 221 may respectively be a version 3 (v3) eUICC and a v3 LPA for supporting a command code signature verifying function. The first profile server 251 and the second profile server 261 may each be a v3 SD-DP+. Also, the operator server 240, the first profile server 250, and the second profile server 260 of FIG. 3 may all be owned by a same mobile operator.

Referring to FIG. 3, in operation 301, the operator server 240 may request the second profile server 261 to prepare an RSP operation. Operation 301 may be performed by using, for example, at least one of a download order message, a confirm order message, and an RPM order message. In operation 301, the operator server 240 may transmit, to the second profile server 261, at least one of a purpose of use of an event ID (MatchingID) and the event ID. The purpose of use of the event ID may be represented by using an indicator indicating, for example, commandCodeOnly=TRUE.

In operation 303, the second profile server 261 may reserve the event ID (MatchingID). An operation of reserving the event ID may be an operation of the second profile server 261 identifying and storing the event ID when the operator server 240 has transmitted the event ID in operation 301, and may be an operation of the second profile server 261 directly generating and storing the event ID when the operator server 240 has not transmitted the event ID in operation 301. The operation of reserving the event ID may further include an operation of the second profile server 261 mapping the purpose of use of the event ID with the event ID when the operator server 240 has transmitted the purpose of use of the event ID. When the operator server 240 has not transmitted the purpose of use of the event ID, the second profile server 261 may use an arbitrary value as the purpose of use of the event ID, or may use a value pre-notified by the operator server 240 to the second profile server 261 via a separate channel or agreed with the second profile server 261 as the purpose of use of the event ID.

In operation 305, the second profile server 261 may reply the reserved event ID (MatchingID) to the operator server 240.

In operation 309, the operator application 230 may start a command code processing procedure. In order for the operator application 230 to start the command code processing procedure, operations by a user (not shown) and the operator server 240 may be performed. In other words, operation 309 may further include the operations by the user and the operator server 240, although not shown in FIG. 3. For example, in order for the command code processing procedure to start, a procedure by which the user newly joins a communication service of an operator or a procedure by which the user requests the communication service of the operator to be updated/managed may be performed. Operation 309 may be performed before operation 301, and when operation 309 is performed before operation 301, operations 301 to 319 may be performed after operation 309.

In operation 311, the operator application 230 may request the LPA 221 to start a command code procedure. Operation 311 may be performed by using, for example, a command code procedure start (initiate LPA API) request message. Operation 311 may further include an operation by which the terminal 200 controls (access control) the operator application 230 to access the LPA 221, according to an embodiment of the terminal. For example, the terminal 200 may control the access by the operator application 230 to the LPA 221, by complexly using one or more of methods of allowing an access to the LPA 221 for all types of applications, using an access control function provided by an operating system (OS) of the terminal, identifying a software package name, developer information, or version information of the operator application 230, and verifying a digital certificate used to sign the operator application 230 or a hash operation result of the digital certificate. As described above, the operation of controlling the access by the operator application 230 to the LPA 221 may be referred to as local authorization verification or device internal authorization verification.

In operation 313, the LPA 221 may generate a first token (eUICC challenge, arbitrary character string) via the eUICC 211. Operation 313 may be performed by using, for example a eUICC character string generation (get eUICC challenge) request message and a eUICC character string generation (get eUICC challenge) response message.

In operation 315, the LPA 221 may transmit, to the operator application 230, a command code generation information (LPA API info). The command code generation information (LPA API info) may include at least one of the first token, information (eUICC info) of the eUICC 211, and information (device info) of the terminal. Operation 315 may be performed by using, for example, a command code procedure start (initiate LPA API) response message.

In operation 317, the operator application 230 may request the operator server 240 to generate a command code by transmitting the command code generation information (LPA API info).

In operation 319, the operator server 240 may generate the command code by using the command code generation information (LPA API info) and the event ID (MatchingID).

In operation 323, the operator server 240 may transmit, to the first profile server 251, the command code and the command code generation information (LPA API info) to request a signature of the command code. Operation 323 may be performed by using, for example, a command code signature (sign command code) request message.

In operation 325, the first profile server 251 may sign the command code by using the command code and the command code generation information (LPA API info), and reply the operator server 240 with a signed command code. Operation 325 may be performed by using, for example, a command code signature (sign command code) response message.

In operation 327, the first profile server 251 may calculate a second token (derived challenge) by using the signature of the first profile server included in the signed command code. Operation 327 may be performed simultaneously with operation 325.

In operation 331, the first profile server 251 may transmit the calculated second token to the second profile server 261. When the first profile server 251 and the second profile server 261 are the same, operation 331 may be omitted.

In operation 333, the operator server 240 may reply the operator application 230 with the signed command code. Operation 333 may be performed simultaneously with operation 331.

In operation 335, the operator application 230 may transmit the signed command code to the LPA 221 to request performing of the command code. Operation 335 may be performed by using, for example, a command code execution (execute command code) request message. Operation 335 may further include an operation by which the terminal 200 controls (access control) the operator application 230 to access the LPA 221, according to an embodiment of the terminal. For example, the terminal 200 may control the access by the operator application 230 to the LPA 221, by complexly using one or more of the methods of allowing the access to the LPA 221 for all types of applications, using the access control function provided by the operating system (OS) of the terminal, identifying the software package name, developer information, or version information of the operator application 230, and verifying the digital certificate used to sign the operator application 230 or the hash operation result of the digital certificate. As described above, the operation of controlling the access by the operator application 230 to the LPA 221 may be referred to as the local authorization verification or device internal authorization verification.

In operation 337, the LPA 221 may transmit the signed command code to the eUICC 211 to request verification of the signature of the signed command code. Operation 337 may be performed by using, for example, a command code verification (verify command code) request message.

In operation 339, the eUICC 211 may verify the signature of the signed command code. The operation by which the eUICC 211 verifies the signature of the signed command code may further include an operation of determining whether the digital certificate of the first profile server 251 included in the command code or stored in the terminal is valid, and an operation of determining whether the signature of the first profile server 251 is valid by using the digital certificate of the first profile server 251. When the signature is valid, the eUICC 211 may calculate the second token (derived challenge, arbitrary character string) from the signature of the first profile server 251, and transmit the second token to the LPA 221 to notify that the signed command code is valid. When the signature is not valid, the eUICC 211 may notify the LPA 221 that the signed command code is not valid and end an operation. Operation 339 may be performed by using, for example, a command code verification (verify command code) response message.

In operation 341, the LPA 221 may reply the operator application 230 with a result of performing the command code. Operation 341 may be performed by using, for example, a command code execution (execute command code) response message.

When the LPA 221 is notified that the signed command code is valid in operation 339, the LPA 221 may request the RSP operation in operation 343 by transmitting, to the second profile server 261, a part or all of the information included in the command code, the second token (euicc-Challenge or derived challenge), and an event ID path (matchingIdSource). Operation 343 may be performed by using, for example, at least one of an HTTPS/TLS connection, an authentication start (initiate authentication) message, a terminal authentication (authenticate client) message, or a profile package request (get bound profile package) message. Although not shown in FIG. 3, operation 343 may further include an operation by the eUICC 211, operator server 240, or first profile server 251. The token transmitted by the LPA 221 in operation 343 may be, for example, the second token (euiccChallenge or derived challenge) calculated by the eUICC 211 from the signature of the first profile server 251 in operation 339. The event ID path (matchingIdSource) transmitted by the LPA 221 in operation 343 may be represented by using, for example, an indicator indicating a command code.

In operation 345, the second profile server 261 may verify the second token (euiccChallenge or derived challenge) and the event ID path (matchingIdSource). The operation by which the second profile server 261 verifies the second token may be, for example, an operation of verifying whether the second token (derived challenge) calculated by the first profile server 251 or second profile server 261 in operation 327 or 331 is the same as the second token (euiccChallenge or derived challenge) calculated by the eUICC 211 in operation 339 and notified by the LPA 221 in operation 343. The operation by which the second profile server 261 verifies the event ID path may be, for example, an operation of verifying whether the purpose of use of the event ID set by the operator server 240 in operation 301 and the event ID path (matchingIdSource) notified by the LPA 221 in operation 343 are the same as the command code. When the second profile server 261 has successfully verified the second token and the event ID path, the second profile server 261 may reply, to the LPA 221, all or a part of data required to perform the RSP operation. The RSP operation of the terminal may include an operation related to RSP, such as an operation of downloading a profile or an operation of installing a profile. The data required to perform the RSP operation may include, for example, profile abstract information (profile metadata) or a remote management command (RPM package).

Referring to FIG. 3, the operator server 240, the first profile server 251, and the second profile server 261 may generate the signed command code and transmit the same to the terminal such as to be verified and used by the terminal by using the command code generation information (LPA API info). Also, while verifying the signed command code, the terminal may transmit, to the second profile server 261, the calculated second token (derived challenge) and the event ID path (matchingIdSource), to notify that the signed command code has been suitably processed.

Figure 4:
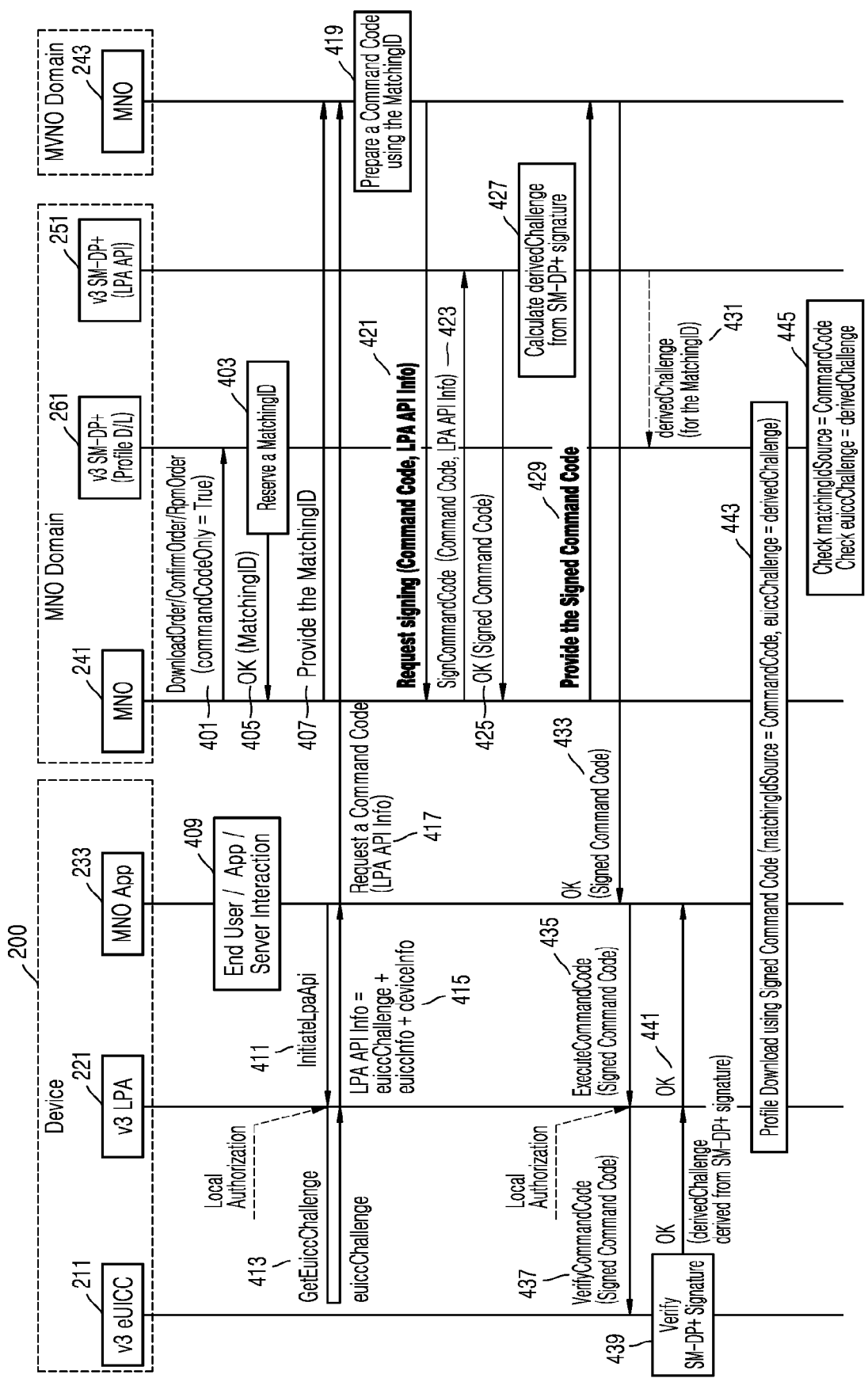
FIG. 4 is a diagram showing procedures in which a terminal generates a command code signed by a first profile server of a first operator, via an application of a second operator installed in the terminal, and downloads an event from a second profile server of the first operator, according to an embodiment of the present disclosure.

FIG. 4 is a diagram showing procedures in which a terminal generates a command code signed by a first profile server of a first operator, via an application of a second operator installed in the terminal, and downloads an event from a second profile server of the first operator, according to an embodiment of the present disclosure.

FIG. 2A will be referred to for descriptions about configurations of the eUICC 211, the LPA 221, the second operator application 233, a first operator server 241, a second operator server 243, the first profile server 251, and the second profile server 261 of FIG. 4. For example, the eUICC 211, the LPA 221, the first profile server 251, and the second profile server 261 may respectively correspond to the eSIM 210, the LPA 220, the first profile server 251, and the second profile server 261 of FIG. 2A.

The first operator server 241 and the second operator server 243 may each be an embodiment of the operator server 240 of FIG. 2A, and the expressions "first" and "second" are only used to indicate that operator servers are different from each other. The eUICC 211 and the LPA 221 may respectively be a v3 eUICC and a v3 LPA for supporting a command code signature verifying function. The first profile server 251 and the second profile server 261 may each be a v3 SD-DP+.

Also, the second operator server 243 or second mobile operator may be a mobile virtual network operator (MVNO), and the second operator application 233 may be an application of the second mobile operator (MVNO app). In FIG. 4, the first operator server 241, the first profile server 251, and the second profile server 261 may be owned by a first mobile operator. Also, in FIG. 4, the second operator server 243 may be owned by the second mobile operator.

Referring to FIG. 4, in operation 401, the first operator server 241 may request the second profile server 261 to prepare an RSP operation. Operation 401 may be performed by using, for example, at least one of a download order message, a confirm order message, and an RPM order message. In operation 401, the first operator server 241 may transmit, to the second profile server 261, at least one of a purpose of use of an event ID (MatchingID) and the event ID. The purpose of use of the event ID may be represented by using an indicator indicating, for example, commandCodeOnly=TRUE.

In operation 403, the second profile server 261 may reserve the event ID (MatchingID). An operation of reserving the event ID may be an operation of the second profile server 261 identifying and storing the event ID when the first operator server 241 has transmitted the event ID in operation 401, and may be an operation of the second profile server 261 directly generating and storing the event ID when the first operator server 241 has not transmitted the event ID in operation 401. The operation of reserving the event ID may further include an operation of the second profile server 261 mapping the purpose of use of the event ID with the event ID when the first operator server 241 has transmitted the purpose of use of the event ID. When the first operator server 241 has not transmitted the purpose of use of the event ID, the second profile server 261 may use an arbitrary value as the purpose of use of the event ID, or may use a value pre-notified by the first operator server 241 to the second profile server 261 via a separate channel or agreed with the second profile server 261 as the purpose of use of the event ID.

In operation 405, the second profile server 261 may reply the reserved event ID (MatchingID) to the first operator server 241.

In operation 407, the first operator server 241 may transmit the event ID to the second operator server 243. Operation 407 may be, for example, a procedure of transferring processing authority or ownership of the RSP operation identified by the event ID from a first mobile operator to a second mobile operator, according to a business agreement relationship between the first mobile operator and the second mobile operator.

In operation 409, the second operator application 233 may start a command code processing procedure. In order for the second operator application 233 to start the command code processing procedure, operations by a user (not shown), the first operator server 241, and the second operator server 243 may be performed. In other words, although not shown in FIG. 4, operation 409 may further include the operations by the user, the first operator server 241, and the second operator server 243. For example, in order for the command code processing procedure to start, a procedure by which the user newly joins a communication service of an operator or a procedure by which the user requests the communication service of the operator to be updated/managed may be performed. Operation 409 may be performed before operation 401, and when operation 409 is performed before operation 401, operations 401 to 419 may be performed after operation 409.

In operation 411, the second operator application 233 may request the LPA 221 to start a command code procedure. Operation 411 may be performed by using, for example, a command code procedure start (initiate LPA API) request message. Operation 411 may further include an operation by which the terminal 200 controls (access control) the second operator application 233 to access the LPA 221, according to an embodiment of the terminal. For example, the terminal 200 may control the access by the second operator application 233 to the LPA 221, by complexly using one or more of the methods of allowing the access to the LPA 221 for all types of applications, using the access control function provided by the operating system (OS) of the terminal, identifying the software package name, developer information, or version information of the second operator application 233, and verifying the digital certificate used to sign the second operator application 233 or the hash operation result of the digital certificate. As described above, the operation of controlling the access by the second operator application 233 to the LPA 221 may be referred to as the local authorization verification or device internal authorization verification.

In operation 413, the LPA 221 may generate a first token (eUICC challenge, arbitrary character string) via the eUICC 211. Operation 413 may be performed by using, for example a eUICC character string generation (get eUICC challenge) request message and a eUICC character string generation (get eUICC challenge) response message.

In operation 415, the LPA 221 may transmit, to the second operator application 233, a command code generation information (LPA API info). The command code generation information (LPA API info) may include at least one of the first token, information (eUICC info) of the eUICC 211, and information (device info) of the terminal. Operation 415 may be performed by using, for example, a command code procedure start (initiate LPA API) response message.

In operation 417, the second operator application 233 may request the second operator server 243 to generate a command code by transmitting the command code generation information (LPA API info).

In operation 419, the second operator server 243 may generate the command code by using the command code generation information (LPA API info) and the event ID (MatchingID).

In operation 421, the second operator server 243 may transmit, to the first operator server 241, the command code and the command code generation information (LPA API info) to request a signature of the command code.

In operation 423, the first operator server 241 may transmit, to the first profile server 251, the command code and the command code generation information (LPA API info) to request a signature of the command code. Operation 423 may be performed by using, for example, a command code signature (sign command code) request message.

In operation 425, the first profile server 251 may sign the command code by using the command code and the command code generation information (LPA API info), and reply the first operator server 241 with a signed command code. Operation 425 may be performed by using, for example, a command code signature (sign command code) response message.

In operation 427, the first profile server 251 may calculate a second token (derived challenge) by using the signature of the first profile server included in the signed command code. Operation 427 may be performed simultaneously with operation 425.

In operation 429, the first operator server 241 may reply the second operator server 243 with the signed command code.

In operation 431, the first profile server 251 may transmit the calculated second token to the second profile server 261. When the first profile server 251 and the second profile server 261 are the same, operation 431 may be omitted.

In operation 433, the second operator server 243 may reply the second operator application 233 with the signed command code. Operation 433 may be performed simultaneously with operation 431.

In operation 435, the second operator application 233 may transmit the signed command code to the LPA 221 to request performing of the command code. Operation 435 may be performed by using, for example, a command code execution (execute command code) request message. Operation 435 may further include an operation by which the terminal 200 controls (access control) the second operator application 233 to access the LPA 221, according to an embodiment of the terminal. For example, the access by the second operator application 233 to the LPA 221 may be controlled by complexly using one or more of the methods of allowing the access to the LPA 221 for all types of applications, using the access control function provided by the OS of the terminal, identifying the software package name, developer information, or version information of the second operator application 233, and verifying the digital certificate used to sign the second operator application 233 or the hash operation result of the digital certificate. As described above, the operation of controlling the access by the second operator application 233 to the LPA 221 may be referred to as the local authorization verification or device internal authorization verification.

In operation 437, the LPA 221 may transmit the signed command code to the eUICC 211 to request verification of the signature of the signed command code. Operation 437 may be performed by using, for example, a command code verification (verify command code) request message.

In operation 439, the eUICC 211 may verify the signature of the signed command code. The operation by which the eUICC 211 verifies the signature of the signed command code may further include an operation of determining whether the digital certificate of the first profile server 251 included in the command code or stored in the terminal is valid, and an operation of determining whether the signature of the first profile server 251 is valid by using the digital certificate of the first profile server 251. When the signature is valid, the eUICC 211 may calculate the second token (euiccChallenge or derived challenge, arbitrary character string) from the signature of the first profile server 251, and transmit the second token to the LPA 221 to notify that the signed command code is valid. When the signature is not valid, the eUICC 211 may notify the LPA 221 that the signed command code is not valid and end an operation. Operation 439 may be performed by using, for example, a command code verification (verify command code) response message.

In operation 441, the LPA 221 may reply the second operator application 233 with a result of performing the command code. Operation 441 may be performed by using, for example, a command code execution (execute command code) response message.

When the LPA 221 is notified that the signed command code is valid in operation 439, the LPA 221 may request the RSP operation in operation 443 by transmitting, to the second profile server 261, a part or all of the information included in the command code, the second token (euiccChallenge), and an event ID path (matchingIdSource). Operation 443 may be performed by using, for example, at least one of an HTTPS/TLS connection, an authentication start (initiate authentication) message, a terminal authentication (authenticate client) message, or a profile package request (get bound profile package) message. Although not shown in FIG. 4, operation 443 may further include operations by the eUICC 211, first operator server 241, second operator server 243, or first profile server 251. The second token transmitted by the LPA 221 in operation 443 may be, for example, the second token (euiccChallenge or derived challenge) calculated by the eUICC 211 from the signature of the first profile server 251 in operation 439. The event ID path (matchingIdSource) transmitted by the LPA 221 in operation 443 may be represented by using, for example, an indicator indicating a command code.

In operation 445, the second profile server 261 may verify the second token (euiccChallenge or derived challenge) and the event ID path (matchingIdSource). The operation by which the second profile server 261 verifies the second token may be, for example, an operation of verifying whether the second token (derived challenge) calculated by the first profile server 251 or second profile server 261 in operation 427 or 431 is the same as the second token (euiccChallenge or derived challenge) calculated by the eUICC 211 in operation 439 and notified by the LPA 221 in operation 443. The operation by which the second profile server 261 verifies the event ID path may be, for example, an operation of verifying whether the purpose of use of the event ID set by the first operator server 241 in operation 401 and the event ID path (matchingIdSource) notified by the LPA 221 in operation 443 are the same as the command code. When the second profile server 261 has successfully verified the second token and the event ID path, the second profile server 261 may reply, to the LPA 221, all or a part of data required to perform the RSP operation. The RSP operation of the terminal may include an operation related to RSP, such as an operation of downloading a profile or an operation of installing a profile. The data required to perform the RSP operation may include, for example, profile abstract information (profile metadata) or a remote management command (RPM package).

Referring to FIG. 4, there is an inconvenience that the second operator server 243 has to exchange (see operations 421 and 429) separate messages to generate and reply the signed command code with the first operator server 241 so as to use functions of the first profile server 251 and second profile server 261 connected to the first operator server 241. Also, like FIG. 3, when the first profile server 251 and the second profile server 261 are different from each other, there is an inconvenience that the first profile server 251 has to transmit (operations 331 and 431) the calculated second token to the second profile server 261 so as to verify the second token.

Figure 5:
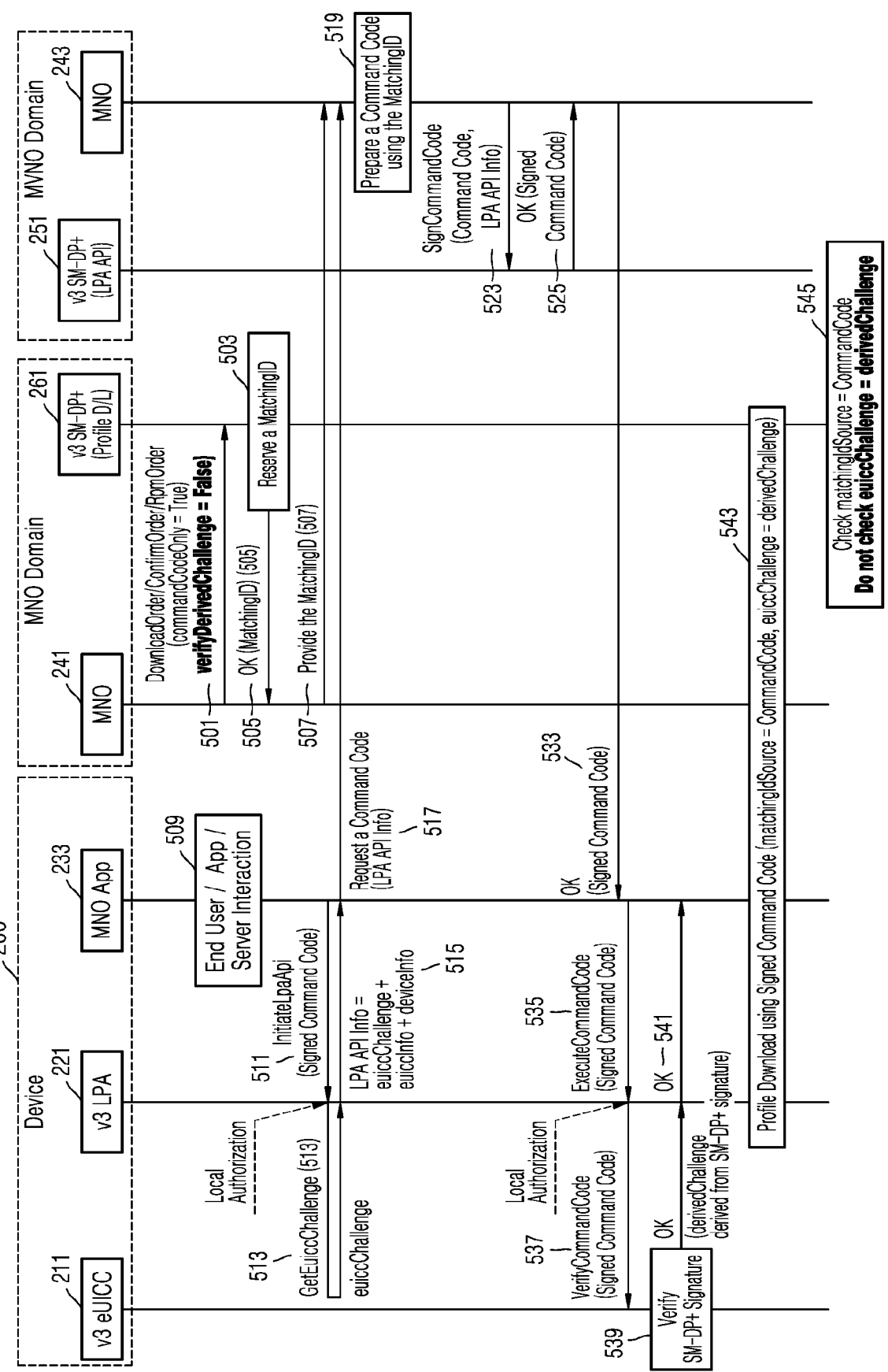
FIG. 5 is a diagram showing procedures in which a terminal generates a command code signed by a first profile server of a second operator, via an application of the second operator installed in the terminal, and downloads an event from a second profile server of a first operator, according to an embodiment of the present disclosure.

FIG. 5 is a diagram showing procedures in which a terminal generates a command code signed by a first profile server of a second operator, via an application of the second operator installed in the terminal, and downloads an event from a second profile server of a first operator, according to an embodiment of the present disclosure.

FIG. 2A will be referred to for descriptions about configurations of the eUICC 211, the LPA 221, the second operator application 233, a first operator server 241, a second operator server 243, the first profile server 251, and the second profile server 261 of FIG. 5. For example, the eUICC 211, the LPA 221, the first profile server 251, and the second profile server 261 may respectively correspond to the eSIM 210, the LPA 220, the first profile server 250, and the second profile server 260 of FIG. 2A.

The first operator server 241 and the second operator server 243 may each be an embodiment of the operator server 240 of FIG. 2A, and the expressions "first" and "second" are only used to indicate that operator servers are different from each other. The eUICC 211 and the LPA 221 may respectively be a v3 eUICC and a v3 LPA for supporting a command code signature verifying function. The first profile server 251 and the second profile server 261 may each be a v3 SD-DP+.

Also, the second operator server 243 or second mobile operator may be a mobile virtual network operator (MVNO), and the second operator application 233 may be an application of the second mobile operator (MVNO app). In FIG. 5, the first operator server 241 and the second profile server 261 may be owned by a first mobile operator. Also, in FIG. 5, the second operator server 243 and the first profile server 251 may be owned by a second mobile operator.

Referring to FIG. 5, in operation 501, the first operator server 241 may request the second profile server 261 to prepare an RSP operation. Operation 501 may be performed by using, for example, at least one of a download order message, a confirm order message, and an RPM order message. In operation 501, the first operator server 241 may transmit, to the second profile server 261, at least one of a purpose of use of an event ID (MatchingID), verification of a second token, and the event ID. The purpose of use of the event ID may be represented by using an indicator indicating, for example, commandCodeOnly=TRUE. The verification of the second token may be represented by using an indicator indicating, for example, verifyDerivedChallenge=FALSE.

In operation 503, the second profile server 261 may reserve (or obtain) the event ID (MatchingID). An operation of reserving the event ID may be an operation of the second profile server 261 identifying and storing the event ID when the first operator server 241 has transmitted the event ID in operation 501, and may be an operation of the second profile server 261 directly generating and storing the event ID when the first operator server 241 has not transmitted the event ID in operation 501. The operation of reserving the event ID may further include an operation of mapping the purpose of use of the event ID and the verification of the second token with the event ID, when the first operator server 241 has transmitted the purpose of use of the event ID and the verification of the second token. When the first operator server 241 has not transmitted the purpose of use of the event ID and/or the verification of the second token, the second profile server 261 may use an arbitrary value as the purpose of use of the event ID and/or the verification of the second token, or may use a value pre-notified by the first operator server 241 or second operator server 243 to the second profile server 261 via a separate channel or agreed with the second profile server 261 as the purpose of use of the event ID and/or the verification of the second token.

In operation 505, the second profile server 261 may reply the reserved event ID (MatchingID) to the first operator server 241.

In operation 507, the first operator server 241 may transmit the event ID to the second operator server 243. Operation 507 may be, for example, a procedure of transferring processing authority or ownership of the RSP operation identified by the event ID from the first mobile operator to the second mobile operator, according to a business agreement relationship between the first mobile operator and the second mobile operator. Operation 507 may be, for example, a procedure of selling a profile of the first mobile operator to the second mobile operator.

In operation 509, the second operator application 233 may start a command code processing procedure. In order for the second operator application 233 to start the command code processing procedure, operations by a user (not shown), the first operator server 241, and the second operator server 243 may be performed. In other words, although not shown in FIG. 5, operation 509 may further include the operations by the user, the first operator server 241, and the second operator server 243. For example, in order for the command code processing procedure to start, a procedure by which the user newly joins a communication service of an operator or a procedure by which the user requests the communication service of the operator to be updated/managed may be performed. Operation 509 may be performed before operation 501, and when operation 509 is performed before operation 501, operations 501 to 519 may be performed after operation 509.

In operation 511, the second operator application 233 may request the LPA 221 to start a command code procedure. In operation 511, the second operator application 233 may further transmit an indicator notifying that the command code procedure will use a signed command code. Operation 511 may be performed by using, for example, a command code procedure start (initiate LPA API) request message. Operation 511 may further include an operation by which the terminal 200 controls (access control) the second operator application 233 to access the LPA 221, according to an embodiment of the terminal. For example, the terminal 200 may control the access by the second operator application 233 to the LPA 221, by complexly using one or more of the methods of allowing the access to the LPA 221 for all types of applications, using the access control function provided by the OS of the terminal, identifying the software package name, developer information, or version information of the second operator application 233, and verifying the digital certificate used to sign the second operator application 233 or the hash operation result of the digital certificate. As described above, the operation of controlling the access by the second operator application 233 to the LPA 221 may be referred to as the local authorization verification or device internal authorization verification.

In operation 513, the LPA 221 may generate a first token (eUICC challenge, arbitrary character string) via the eUICC 211. Operation 513 may be performed by using, for example a eUICC character string generation (get eUICC challenge) request message and a eUICC character string generation (get eUICC challenge) response message.

In operation 515, the LPA 221 may transmit, to the second operator application 233, a command code generation information (LPA API info). The command code generation information (LPA API info) may include at least one of the first token, information (eUICC info) of the eUICC 211, and information (device info) of the terminal. Operation 515 may be performed by using, for example, a command code procedure start (initiate LPA API) response message.

In operation 517, the second operator application 233 may request the second operator server 243 to generate a command code by transmitting the command code generation information (LPA API info).

In operation 519, the second operator server 243 may generate the command code by using the command code generation information (LPA API info) and the event ID (MatchingID).

In operation 523, the second operator server 243 may transmit, to the first profile server 251, the command code and the command code generation information (LPA API info) to request a signature of the command code. Operation 523 may be performed by using, for example, a command code signature (sign command code) request message.

In operation 525, the first profile server 251 may sign the command code by using the command code and the command code generation information (LPA API info), and reply the second operator server 243 with a signed command code. Operation 525 may be performed by using, for example, a command code signature (sign command code) response message.

In operation 533, the second operator server 243 may reply the second operator application 233 with the signed command code.

In operation 535, the second operator application 233 may transmit the signed command code to the LPA 221 to request performing of the command code. Operation 535 may be performed by using, for example, a command code execution (execute command code) request message. Operation 535 may further include an operation by which the terminal 200 controls (access control) the second operator application 233 to access the LPA 221, according to an embodiment of the terminal. For example, the access by the second operator application 233 to the LPA 221 may be controlled by complexly using one or more of the methods of allowing the access to the LPA 221 for all types of applications, using the access control function provided by the OS of the terminal, identifying the software package name, developer information, or version information of the second operator application 233, and verifying the digital certificate used to sign the second operator application 233 or the hash operation result of the digital certificate. As described above, the operation of controlling the access by the second operator application 233 to the LPA 221 may be referred to as the local authorization verification or device internal authorization verification.

In operation 537, the LPA 221 may transmit the signed command code to the eUICC 211 to request verification of the signature of the signed command code. Operation 537 may be performed by using, for example, a command code verification (verify command code) request message.

In operation 539, the eUICC 211 may verify the signature of the signed command code. The operation by which the eUICC 211 verifies the signature of the signed command code may further include an operation of determining whether the digital certificate of the first profile server 251 included in the command code or stored in the terminal is valid, and an operation of determining whether the signature of the first profile server 251 is valid by using the digital certificate of the first profile server 251. When the signature is valid, the eUICC 211 may calculate the second token (euiccChallenge or derived challenge, arbitrary character string) from the signature of the first profile server 251, and transmit the second token to the LPA 221 to notify that the signed command code is valid. When the signature is not valid, the eUICC 211 may notify the LPA 221 that the signed command code is not valid and end an operation. Operation 539 may be performed by using, for example, a command code verification (verify command code) response message.

In operation 541, the LPA 221 may reply the second operator application 233 with a result of performing the command code. Operation 541 may be performed by using, for example, a command code execution (execute command code) response message.

When the LPA 221 is notified that the signed command code is valid in operation 539, the LPA 221 may request the RSP operation in operation 543 by transmitting, to the second profile server 261, a part or all of the information included in the command code, the second token (euiccChallenge or derived challenge), and an event ID path (matchingIdSource). Operation 543 may be performed by using, for example, at least one of an HTTPS/TLS connection, an authentication start (initiate authentication) message, a terminal authentication (authenticate client) message, or a profile package request (get bound profile package) message. Although not shown in FIG. 5, operation 543 may further include operations by the eUICC 211, first operator server 241, second operator server 243, or first profile server 251. The second token transmitted by the LPA 221 in operation 543 may be, for example, the second token (euiccChallenge or derived challenge) calculated by the eUICC 211 from the signature of the first profile server 251 in operation 539. The event ID path (matchingIdSource) transmitted by the LPA 221 in operation 443 may be represented by using, for example, an indicator indicating a command code. According to an embodiment of the present disclosure, operation 541 may be omitted. For example, the LPA 221 may not generate the second token via the eUICC 211. Also, in operation 543, the LPA 221 may not transmit the second token (euiccChallenge) to the second profile server 261.

In operation 545, the second profile server 261 may verify the event ID path (matchingIdSource) without a token, when the first operator server 241 has notified that token verification is not necessary in operation 501. The operation by which the second profile server 261 verifies the event ID path may be, for example, an operation of verifying whether the purpose of use of the event ID set by the first operator server 241 in operation 501 and the event ID path (matchingIdSource) notified by the LPA 221 in operation 543 are the same. When the second profile server 261 has successfully verified the event ID path, the second profile server 261 may reply, to the LPA 221, all or a part of data required to perform the RSP operation. The RSP operation of the terminal may include an operation related to RSP, such as an operation of downloading a profile or an operation of installing a profile. The data required to perform the RSP operation may include, for example, profile abstract information (profile metadata) or a remote management command (RPM package).

Referring to FIG. 5, because the second operator server 243 is able to obtain (see operations 523 and 525) the signed command code from the first profile server 251 connected to the second operator server 243, separate messages to generate and reply the signed command code, for example, as in operations 421 and 429 of FIG. 4, are not required to be exchanged with the first profile server 251. Also, when the first operator server 241 has notified that the verification of the second token is not required (see operation 501), it is not required for the first profile server 251 to transmit the second token calculated by the eUICC 211 to the second profile server 261, and the second profile server 261 to perform an additional operation of verifying a token.

Figure 6:
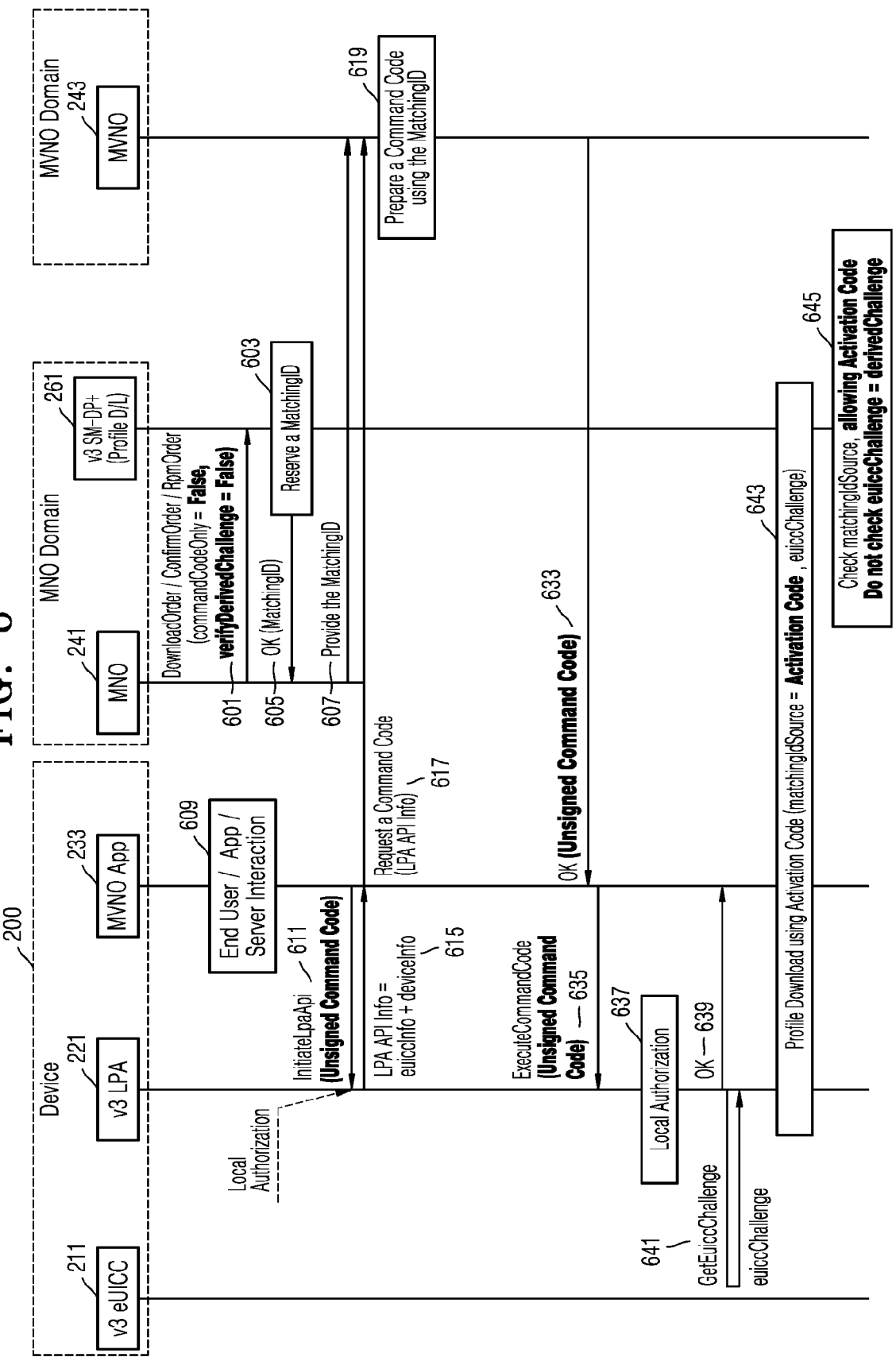
FIG. 6 is a diagram showing procedures in which a terminal generates an unsigned command code via an application of a second operator installed in the terminal, and downloads an event from a second profile server of a first operator, according to an embodiment of the present disclosure.

FIG. 6 is a diagram showing procedures in which a terminal generates an unsigned command code via an application of a second operator installed in the terminal, and downloads an event from a second profile server of a first operator, according to an embodiment of the present disclosure.

FIG. 2A will be referred to for descriptions about configurations of the eUICC 211, the LPA 221, the second operator application 233, the first operator server 241, the second operator server 243, and the second profile server 261 of FIG. 6. For example, the eUICC 211, the LPA 221, and the second profile server 261 may respectively correspond to the eUICC 211, the LPA 220, and the second profile server 260 of FIG. 2A.

The first operator server 241 and the second operator server 243 may each be an embodiment of the operator server 240 of FIG. 2A, and the expressions "first" and "second" are only used to indicate that operator servers are different from each other. The eUICC 211 and the LPA 221 may respectively be a v3 eUICC and a v3 LPA for supporting a command code signature verifying function. Also, the second profile server 261 may be a v3 SD-DP+.

Also, the second operator server 243 or second mobile operator may be an MVNO, and the second operator application 233 may be an application of the second mobile operator (MVNO app). In FIG. 6, the first operator server 241 and the second profile server 261 may be owned by a first mobile operator. Also, in FIG. 6, the second operator server 243 may be owned by the second mobile operator.

Referring to FIG. 6, in operation 601, the first operator server 241 may request the second profile server 261 to prepare an RSP operation. Operation 601 may be performed by using, for example, at least one of a download order message, a confirm order message, and an RPM order message. In operation 601, the first operator server 241 may transmit, to the second profile server 261, at least one of a purpose of use of an event ID (MatchingID), verification of a second token, and the event ID. The purpose of use of the event ID may be represented by using an indicator indicating, for example, commandCodeOnly=FALSE. The indicator indicating commandCodeOnly=FALSE may be an indicator indicating that an unsigned command code will be used for an RSP procedure. The verification of the second token may be represented by using an indicator indicating, for example, verifyDerivedChallenge=FALSE.

In operation 603, the second profile server 261 may reserve (or obtain) the event ID (MatchingID). An operation of reserving the event ID may be an operation of the second profile server 261 identifying and storing the event ID when the first operator server 241 has transmitted the event ID in operation 601, and may be an operation of the second profile server 261 directly generating and storing the event ID when the first operator server 241 has not transmitted the event ID in operation 601. The operation of reserving the event ID may further include an operation of mapping the purpose of use of the event ID and the verification of the second token with the event ID, when the first operator server 241 has transmitted the purpose of use of the event ID and the verification of the second token. When the first operator server 241 has not transmitted the purpose of use of the event ID and/or the verification of the second token, the second profile server 261 may use an arbitrary value as the purpose of use of the event ID and/or the verification of the second token, or may use a value pre-notified by the first operator server 241 or second operator server 243 to the second profile server 261 via a separate channel or agreed with the second profile server 261 as the purpose of use of the event ID and/or the verification of the second token.

In operation 605, the second profile server 261 may reply the reserved event ID (MatchingID) to the first operator server 241.

In operation 607, the first operator server 241 may transmit the event ID to the second operator server 243. Operation 607 may be, for example, a procedure of transferring processing authority or ownership of the RSP operation identified by the event ID from a first mobile operator to a second mobile operator, according to a business agreement relationship between the first mobile operator and the second mobile operator. Operation 607 may be, for example, a procedure of selling a profile of the first mobile operator to the second mobile operator.

In operation 609, the second operator application 233 may start a command code processing procedure. In order for the second operator application 233 to start the command code processing procedure, operations by a user (not shown), the first operator server 241, and the second operator server 243 may be performed. In other words, although not shown in FIG. 6, operation 609 may further include the operations by the user, the first operator server 241, and the second operator server 243. For example, in order for the command code processing procedure to start, a procedure by which the user newly joins a communication service of an operator or a procedure by which the user requests the communication service of the operator to be updated/managed may be performed. Operation 609 may be performed before operation 601, and when operation 609 is performed before operation 601, operations 601 to 619 may be performed after operation 609.

In operation 611, the second operator application 233 may request the LPA 221 to start a command code procedure. In operation 611, the second operator application 233 may further transmit an indicator notifying that the command code procedure will use the unsigned command code. Operation 611 may be performed by using, for example, a command code procedure start (initiate LPA API) request message. Operation 611 may further include an operation by which the terminal 200 controls (access control) the second operator application 233 to access the LPA 221, according to an embodiment of the terminal. For example, the terminal 200 may control the access by the second operator application 233 to the LPA 221, by complexly using one or more of the methods of allowing the access to the LPA 221 for all types of applications, using the access control function provided by the OS of the terminal, identifying the software package name, developer information, or version information of the second operator application 233, and verifying the digital certificate used to sign the second operator application 233 or the hash operation result of the digital certificate. As described above, the operation of controlling the access by the second operator application 233 to the LPA 221 may be referred to as the local authorization verification or device internal authorization verification. When the unsigned command code is used for the command code procedure, an operation by which the LPA 221 requests the eUICC 211 to generate a first token as in operation 513 of FIG. 5 may be omitted. The omitting of the operation of generating the first token when the unsigned command code is used may be identically applied to several embodiments of the present disclosure.

In operation 615, the LPA 221 may transmit, to the second operator application 233, a command code generation information (LPA API info). The command code generation information (LPA API info) may include at least one of information (eUICC info) of the eUICC 211 and information (device info) of the terminal. Operation 615 may be performed by using, for example, a command code procedure start (initiate LPA API) response message.

In operation 617, the second operator application 233 may request the second operator server 243 to generate a command code by transmitting the command code generation information (LPA API info).

In operation 619, the second operator server 243 may generate the command code by using the command code generation information (LPA API info) and the event ID (MatchingID).

In operation 633, the second operator server 243 may reply the second operator application 233 with the unsigned command code.

In operation 635, the second operator application 233 may transmit the unsigned command code to the LPA 221 to request performing of the command code. Operation 635 may be performed by using, for example, a command code execution (execute command code) request message. Operation 635 may further include an operation by which the terminal 200 controls (access control) the second operator application 233 to access the LPA 221, according to an embodiment of the terminal. For example, the terminal 200 may control the access by the second operator application 233 to the LPA 221, by complexly using one or more of the methods of allowing the access to the LPA 221 for all types of applications, using the access control function provided by the OS of the terminal, identifying the software package name, developer information, or version information of the second operator application 233, identifying whether the software package name, developer information, or version information of the second operator application 233 is included in an application list registered in the LPA 221 or the OS of terminal, and verifying the digital certificate used to sign the second operator application 233 or the hash operation result of the digital certificate. As described above, the operation of controlling the access by the second operator application 233 to the LPA 221 may be referred to as the local authorization verification or device internal authorization verification.

In operation 637, the LPA 221 may perform additional verification on the performing of the command code. Operation 637 may be, for example, local authorization verification that is same as or different from the local authorization verification performed in operation 635. According to an embodiment of the present disclosure, the additional verification of operation 637 may include at least a part of a verification operation of operation 635. For example, in operation 637, the terminal 200 may verify the command code by identifying whether the software package name, developer information, or version information of the second operator application 233 is included in the application list registered in the LPA 221 or the OS of the terminal. In order for the LPA 221 to perform the additional verification on the performing of the command code, operations by the user, first operator server 241, or second operator server 243 may be performed. In other words, operation 637 may further include the operations by the user, first operator server 241, or second operator server 243. Also, operation 637 may include, for example, an operation by which the terminal queries the user about an intention of performing (or executing) the command code, via a screen or voice, and asks for consent of the user. The operation by which the terminal asks for consent of the user may include receiving, from the user, an operation of the user selecting yes or no, inputting a set password, or inputting biometric information, such as a fingerprint or iris of the user. The terminal 200 may provide a user interface to the user, query the user about the intention of performing the command code according to the method described above via the user interface, and receive a response from the user. The user interface may be provided in various forms. For example, the user interface may be visually displayed or auditorily provided as sound, but is not limited thereto, and may be provided to the user according to various methods.

In operation 639, the LPA 221 may reply the second operator application 233 with a verification result of performing the command code. Operation 639 may be performed by using, for example, a command code execution (execute command code) response message.

When the local authorization verification and additional verification regarding the performing of the command code by the LPA 221 are successful in operation 635 and/or 637, the LPA 221 may generate a second token (eUICC Challenge, arbitrary character string) via the eUICC 211, in operation 641. Operation 641 may be performed by using, for example a eUICC character string generation (get eUICC challenge) request message and a eUICC character string generation (get eUICC challenge) response message.

In operation 643, the LPA 221 may request the second profile server 261 to perform the RSP operation by transmitting a part or all of information included in the command code, the second token (euiccChallenge), and an event ID path (matchingIdSource). Operation 643 may be performed by using, for example, at least one of an HTTPS/TLS connection, an authentication start (initiate authentication) message, a terminal authentication (authenticate client) message, or a profile package request (get bound profile package) message. Although not shown in FIG. 6, operation 643 may further include operations by the eUICC 211, first operator server 241, second operator server 243, first profile server 251, or second profile server 261. The second token transmitted by the LPA 221 in operation 643 may be, for example, the second token (eUICC challenge) generated by the eUICC 211 in operation 641. The event ID path (matchingIdSource) transmitted by the LPA 221 in operation 643 may be represented by using, for example, an indicator indicating an activation code (or a command code). According to an embodiment of the present disclosure, operation 641 may be omitted. For example, the LPA 221 may not generate the second token via the eUICC 211. Accordingly, the operation of transmitting or receiving the eUICC character string generation (get eUICC challenge) request message and the eUICC character string generation (get eUICC challenge) response message may be omitted. Also, in operation 643, the LPA 221 may not transmit the second token (euiccChallenge) to the second profile server 261.

In operation 645, the second profile server 261 may verify the event ID path (matchingIdSource) without a token, when the first operator server 241 has notified that token verification is not necessary in operation 601. The operation by which the second profile server 261 verifies the event ID path may be, for example, an operation of verifying whether the event ID path (matchingIdSource) notified by the LPA 221 in operation 643 is the command code or activation code, because the purpose of use of the event ID is not limited to the command code by the first operator server 241 in operation 601. When the second profile server 261 has successfully verified the event ID path, the second profile server 261 may reply, to the LPA 221, all or a part of data required to perform the RSP operation. The RSP operation of the terminal may include an operation related to RSP, such as an operation of downloading a profile or an operation of installing a profile. The data required to perform the RSP operation may include, for example, profile abstract information (profile metadata) or a remote management command (RPM package).

Referring to FIG. 6, when the purpose of the event ID is not limited to the command code by the first operator server 241 during the operation of preparing for the RSP operation (operation 601), the second operator server 243 may generate (operation 619) the unsigned command code without the first profile server 251. Also, when the first operator server 241 has notified that the verification of the second token is not required (see operation 601), it is not required for the first profile server 251 to transmit the second token calculated by the eUICC 211 to the second profile server 261, and the second profile server 261 to perform an additional operation of verifying a token.

Figure 7:
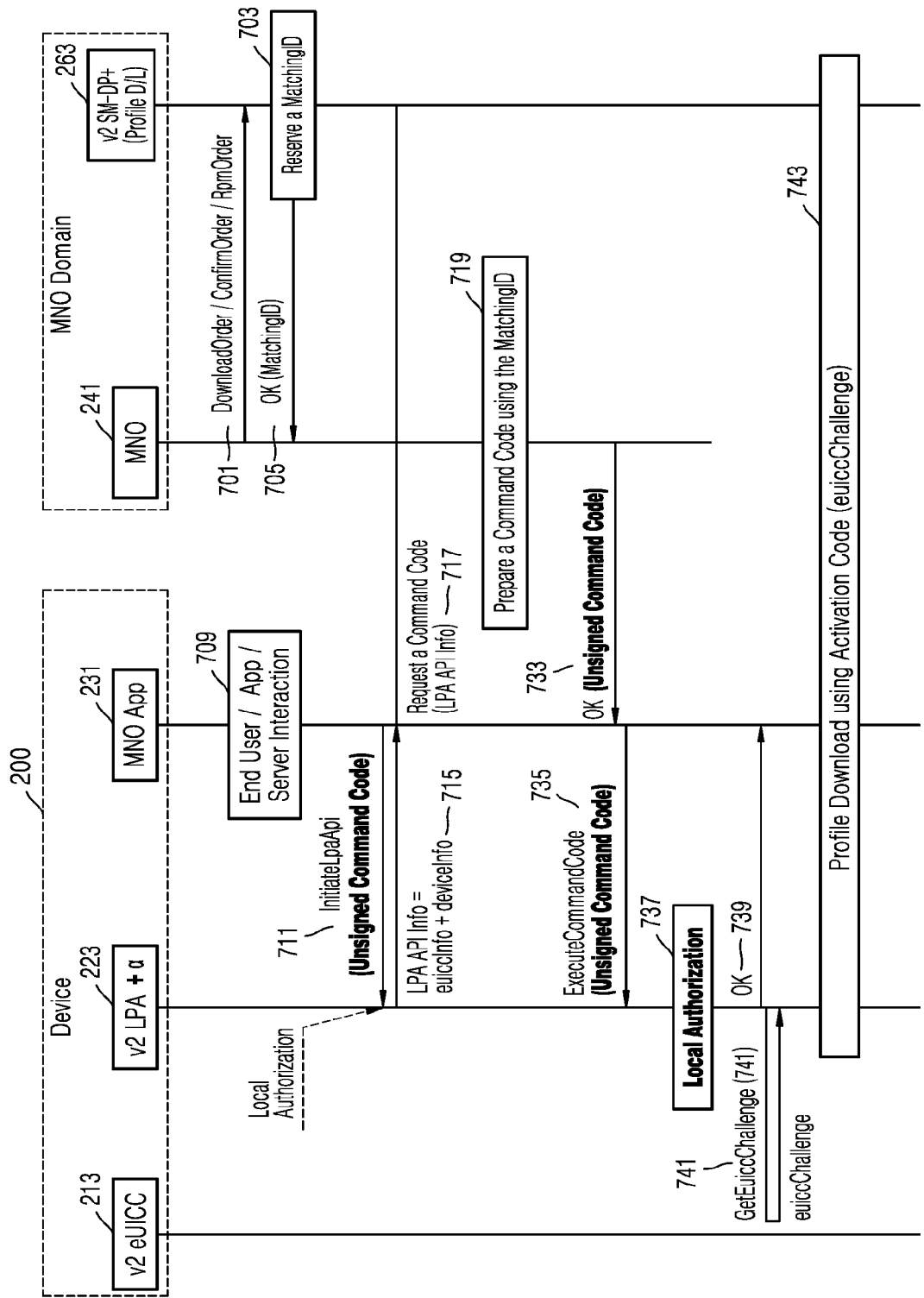
FIG. 7 is a diagram showing procedures in which a terminal generates an unsigned command code via an application of a first operator installed in the terminal, and downloads an event from a second profile server of the first operator, according to an embodiment of the present disclosure.

FIG. 7 is a diagram showing procedures in which a terminal generates an unsigned command code via an application of a first operator installed in the terminal, and downloads an event from a second profile server of the first operator, according to an embodiment of the present disclosure.

FIG. 2A will be referred to for descriptions about configurations of an eUICC 213, an LPA 223, the first operator application 231, the first operator server 241, and a second profile server 263 of FIG. 7. For example, the eUICC 213, the LPA 223, the first operator server 241, and the second profile server 263 may respectively correspond to the eSIM 210, the LPA 220, the operator server 240, and the second profile server 260 of FIG. 2A.

The eUICC 213 and the LPA 223 may respectively be a v2 eUICC and a v2 LPA not supporting a command code signature verifying function. Also, the second profile server 263 may be a v2 SD-DP+. In FIG. 7, the first operator server 241 and the second profile server 263 may be owned by a first mobile operator.

Referring to FIG. 7, in operation 701, the first operator server 241 may request the second profile server 263 to prepare an RSP operation. Operation 701 may be performed by using, for example, at least one of a download order message, a confirm order message, and an RPM order message. In operation 701, the first operator server 241 may not transmit, to the second profile server 263, a purpose of use of an event ID (MatchingID) and verification of a second token, and may transmit the event ID. According to an embodiment of the present disclosure, the first operator server 241 may not transmit the purpose of use of the event ID (MatchingID) to the second profile server 263 to indicate the second profile server 263 that an unsigned command code will be used for an RSP procedure.

In operation 703, the second profile server 263 may reserve (or obtain) the event ID (MatchingID). An operation of reserving the event ID may be an operation of the second profile server 263 identifying and storing the event ID when the first operator server 241 has transmitted the event ID in operation 701, and may be an operation of the second profile server 263 directly generating and storing the event ID when the first operator server 241 has not transmitted the event ID in operation 701. The operation of reserving the event ID may further include an operation of mapping the purpose of use of the event ID and the verification of the second token with the event ID, when the first operator server 241 has transmitted the purpose of use of the event ID. When the first operator server 241 has not transmitted the purpose of use of the event ID and/or the verification of the second token, the second profile server 263 may use an arbitrary value as the purpose of use of the event ID and/or the verification of the second token, or may use a value pre-notified by the first operator server 241 or second operator server 243 to the second profile server 263 via a separate channel or agreed with the second profile server 263 as the purpose of use of the event ID and/or the verification of the second token.

In operation 705, the second profile server 263 may reply the reserved event ID (MatchingID) to the first operator server 241.

In operation 709, the first operator application 231 may start a command code processing procedure. In order for the first operator application 231 to start the command code processing procedure, operations by a user (not shown) and the first operator server 241 may be performed. In other words, operation 709 may further include the operations by the user and the first operator server 241, although not shown in FIG. 7. For example, in order for the command code processing procedure to start, a procedure by which the user newly joins a communication service of an operator or a procedure by which the user requests the communication service of the operator to be updated/managed may be performed. Operation 709 may be performed before operation 701, and when operation 709 is performed before operation 701, operations 701 to 719 may be performed after operation 709.

In operation 711, the first operator application 231 may request the LPA 223 to start a command code procedure. In operation 711, the first operator application 231 may further transmit an indicator notifying that the command code procedure will use the unsigned command code. Operation 711 may be performed by using, for example, a command code procedure start (initiate LPA API) request message. Operation 711 may further include an operation by which the terminal 200 controls (access control) a second operator application 235 to access the LPA 223, according to an embodiment of the terminal. For example, the terminal 200 may control the access by the first operator application 231 to the LPA 223, by complexly using one or more of the methods of allowing the access to the LPA 223 for all types of applications, using the access control function provided by the OS of the terminal, identifying the software package name, developer information, or version information of the first operator application 231, and verifying the digital certificate used to sign the first operator application 231 or the hash operation result of the digital certificate. As described above, the operation of controlling the access by the first operator application 231 to the LPA 223 may be referred to as the local authorization verification or device internal authorization verification.

In operation 715, the LPA 223 may transmit, to the first operator application 231, a command code generation information (LPA API info). The command code generation information (LPA API info) may include at least one of information (eUICC info) of the eUICC 213 and information (device info) of the terminal. Operation 715 may be performed by using, for example, a command code procedure start (initiate LPA API) response message.

In operation 717, the first operator application 231 may request the first operator server 241 to generate a command code by transmitting the command code generation information (LPA API info).

In operation 719, the first operator server 241 may generate the command code by using the command code generation information (LPA API info) and the event ID (MatchingID).

In operation 733, the first operator server 241 may reply the first operator application 231 with the unsigned command code.

In operation 735, the first operator application 235 may transmit the unsigned command code to the LPA 223 to request performing of the command code. Operation 735 may be performed by using, for example, a command code execution (execute command code) request message. Operation 735 may further include an operation by which the terminal 200 controls (access control) the first operator application 231 to access the LPA 223, according to an embodiment of the terminal. For example, the access by the first operator application 231 to the LPA 223 may be controlled by complexly using one or more of the methods of allowing the access to the LPA 223 for all types of applications, using the access control function provided by the OS of the terminal, identifying the software package name, developer information, or version information of the first operator application 231, identifying whether the software package name, developer information, or version information of the first operator application 231 is included in an application list registered in the LPA 223 or the OS of terminal, and verifying the digital certificate used to sign the first operator application 231 or the hash operation result of the digital certificate. As described above, the operation of controlling the access by the first operator application 231 to the LPA 223 may be referred to as the local authorization verification or device internal authorization verification.

In operation 737, the LPA 223 may perform additional verification on the performing of the command code. Operation 737 may be, for example, local authorization verification that is same as or different from the local authorization verification performed in operation 735. According to an embodiment of the present disclosure, the additional verification of operation 737 may include at least a part of a verification operation of operation 735. For example, in operation 737, the terminal 200 may verify the command code by identifying whether the software package name, developer information, or version information of the first operator application 223 is included in the application list registered in the LPA 223 or the OS of the terminal. In order for the LPA 223 to perform the additional verification on the performing of the command code, operations by the user or first operator server 241 may be performed. In other words, operation 737 may further include the operations by the user or first operator server 241. Also, operation 737 may include, for example, an operation by which the terminal queries the user about an intention of performing (or executing) the command code, via a screen or voice, and asks for consent of the user. The operation by which the terminal asks for consent of the user may include receiving, from the user, an operation of the user selecting yes or no, inputting a set password, or inputting biometric information, such as a fingerprint or iris of the user. The terminal 200 may provide a user interface to the user, query the user about the intention of performing the command code according to the method described above via the user interface, and receive a response from the user. The user interface may be provided in various forms. For example, the user interface may be visually displayed or auditorily provided as sound, but is not limited thereto, and may be provided to the user according to various methods.

In operation 739, the LPA 223 may reply the second operator application 235 with a verification result of performing the command code. Operation 739 may be performed by using, for example, a command code execution (execute command code) response message.

When the local authorization verification and additional verification regarding the performing of the command code by the LPA 223 are successful in operation 735 and/or 737, the LPA 223 may generate a second token (eUICC Challenge, arbitrary character string) via the eUICC 213, in operation 741. Operation 741 may be performed by using, for example a eUICC character string generation (get eUICC challenge) request message and a eUICC character string generation (get eUICC challenge) response message.

In operation 743, the LPA 223 may request the second profile server 263 to perform the RSP operation by transmitting a part or all of information included in the command code and the token (euiccChallenge). Operation 743 may be performed by using, for example, at least one of an HTTPS/TLS connection, an authentication start (initiate authentication) message, a terminal authentication (authenticate client) message, or a profile package request (get bound profile package) message. Although not shown in FIG. 7, operation 743 may further include operations by the eUICC 213, first operator server 241, second operator server 243, first profile server 250, or second profile server 263. The token transmitted by the LPA 223 in operation 743 may be, for example, the second token (eUICC challenge) generated by the eUICC 213 in operation 741. Then, the second profile server 263 may reply the LPA 223 with all or a part of data required to perform the RSP operation. According to an embodiment of the present disclosure, the second profile server 263 may verify information included in the command code received from the LPA 223, and reply the LPA 223 with the all or part of the data required to perform the RSP operation, according to a result of the verification. The operation of verifying the information included in the command code may be, for example, an operation of determining whether the information included in the command code is identical to the event ID (MatchingID) stored in operation 703. The RSP operation of the terminal may include an operation related to RSP, such as an operation of downloading a profile or an operation of installing a profile. The data required to perform the RSP operation may include, for example, profile abstract information (profile metadata) or a remote management command (RPM package). According to an embodiment of the present disclosure, operation 741 may be omitted. For example, the LPA 223 may not generate the second token via the eUICC 213. Accordingly, the operation of transmitting or receiving the eUICC character string generation (get eUICC challenge) request message and the eUICC character string generation (get eUICC challenge) response message may be omitted. Also, in operation 743, the LPA 223 may not transmit the second token (euiccChallenge) to the second profile server 263.

Referring to FIG. 7, the terminal may process the command code generated by the first operator application 231 and first operator server 241, even for the eUICC 213 that is a v2 eUICC not supporting signature verification of the command code. Also, when the first operator server 241 did not limit the purpose of event ID in the command code during the operation of preparing the RSP operation (operation 701), the unsigned command code may be generated (operation 719) without the first profile server 250 or 251. Also, when the first operator server 241 has notified that the verification of the second token is not required (see operation 701), it is not required for the first profile server 250 to transmit the second token calculated by the eUICC 213 to the second profile server 263, and the second profile server 263 to perform an additional operation of verifying the second token.

Figure 8:
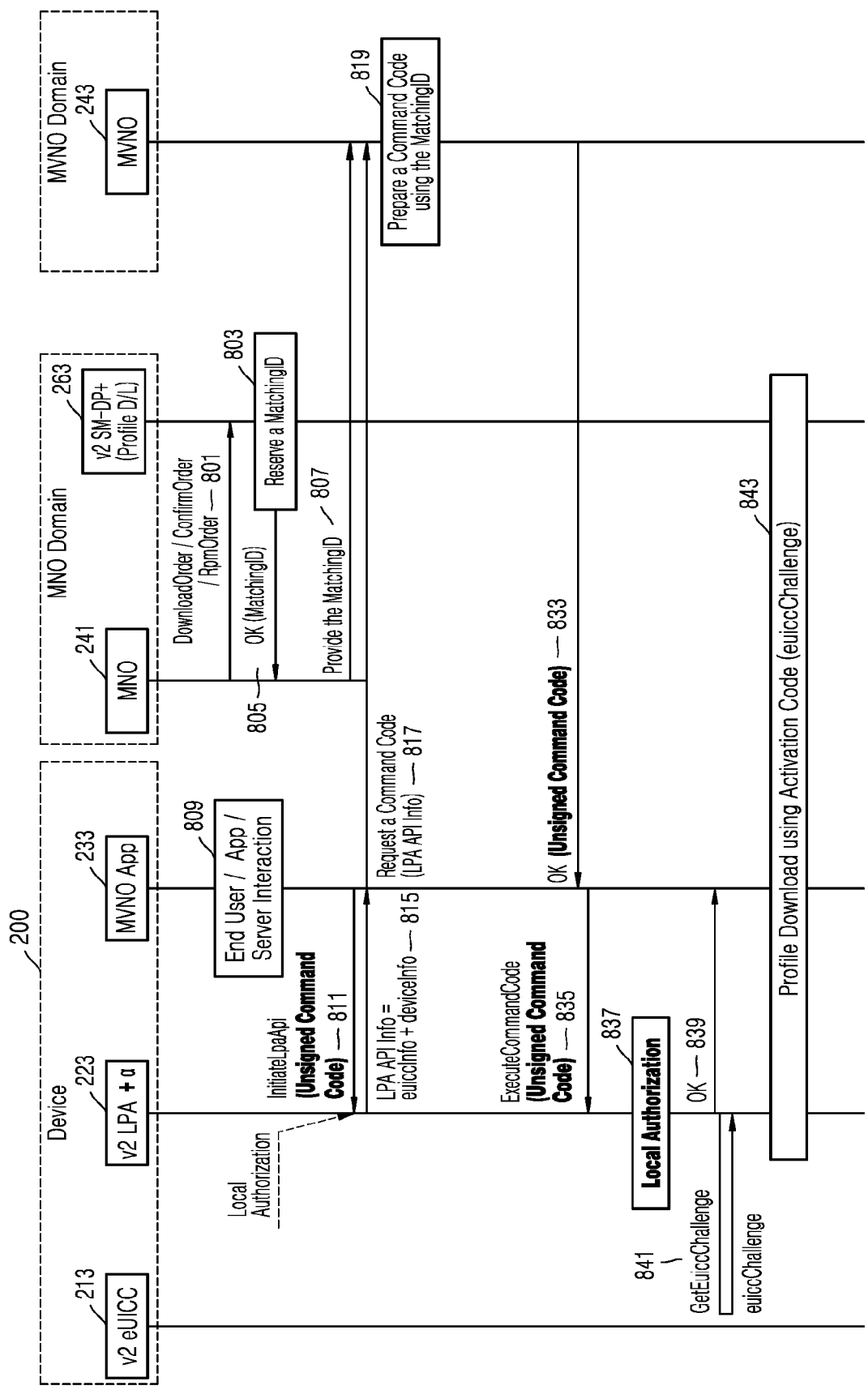
FIG. 8 is a diagram showing procedures in which a terminal generates an unsigned command code via an application of a second operator installed in the terminal, and downloads an event from a second profile server of a first operator, according to an embodiment of the present disclosure.

FIG. 8 is a diagram showing procedures in which a terminal generates an unsigned command code via an application of a second operator installed in the terminal, and downloads an event from a second profile server of a first operator, according to an embodiment of the present disclosure.

FIG. 2A will be referred to for descriptions about configurations of the eUICC 213, the LPA 223, the second operator application 233, the first operator server 241, the second operator server 243, and the second profile server 263 of FIG. 8. For example, the eUICC 213, the LPA 223, and the second profile server 263 may respectively correspond to the eSIM 210, the LPA 220, and the second profile server 260 of FIG. 2A.

The first operator server 241 and the second operator server 243 may each be an embodiment of the operator server 240 of FIG. 2A, and the expressions "first" and "second" are only used to indicate that operator servers are different from each other. The eUICC 213 and the LPA 223 may respectively be a v2 eUICC and a v2 LPA not supporting a signature verifying function. Also, the second profile server 263 may be a v2 SD-DP+.

Also, the second operator server 243 or second mobile operator may be a mobile virtual network operator (MVNO), and the second operator application 233 may be an application of the second mobile operator (MVNO app). In FIG. 8, the first operator server 241 and the second profile server 263 may be owned by a first mobile operator. Also, in FIG. 8, the second operator server 243 may be owned by the second mobile operator.

Referring to FIG. 8, in operation 801, the first operator server 241 may request the second profile server 263 to prepare an RSP operation. Operation 801 may be performed by using, for example, at least one of a download order message, a confirm order message, and an RPM order message. In operation 801, the first operator server 241 may not transmit, to the second profile server 263, a purpose of use of an event ID (MatchingID) and verification of a second token, and may transmit the event ID. According to an embodiment of the present disclosure, the first operator server 241 may not transmit the purpose of use of the event ID (MatchingID) to the second profile server 263 to indicate the second profile server 263 that an unsigned command code will be used for an RSP procedure.

In operation 803, the second profile server 263 may reserve (or obtain) the event ID (MatchingID). An operation of reserving the event ID may be an operation of the second profile server 263 identifying and storing the event ID when the first operator server 241 has transmitted the event ID in operation 801, and may be an operation of the second profile server 263 directly generating and storing the event ID when the first operator server 241 has not transmitted the event ID in operation 801. The operation of reserving the event ID may further include an operation of mapping the purpose of use of the event ID and the verification of the second token with the event ID, when the first operator server 241 has transmitted the purpose of use of the event ID. When the first operator server 241 has not transmitted the purpose of use of the event ID and/or the verification of the second token, the second profile server 263 may use an arbitrary value as the purpose of use of the event ID and/or the verification of the second token, or may use a value pre-notified by the first operator server 241 or second operator server 243 to the second profile server 263 via a separate channel or agreed with the second profile server 263 as the purpose of use of the event ID and/or the verification of the second token.

In operation 805, the second profile server 263 may reply the reserved event ID (MatchingID) to the first operator server 241.

In operation 807, the first operator server 241 may transmit the event ID to the second operator server 243. Operation 807 may be, for example, a procedure of transferring processing authority or ownership of the RSP operation identified by the event ID from a first mobile operator to a second mobile operator, according to a business agreement relationship between the first mobile operator and the second mobile operator. Operation 807 may be, for example, a procedure of selling a profile of the first mobile operator to the second mobile operator.

In operation 809, the second operator application 235 may start a command code processing procedure. In order for the second operator application 235 to start the command code processing procedure, operations by a user (not shown), the first operator server 241, and the second operator server 243 may be performed. In other words, although not shown in FIG. 8, operation 809 may further include the operations by the user, the first operator server 241, and the second operator server 243. For example, in order for the command code processing procedure to start, a procedure by which the user newly joins a communication service of an operator or a procedure by which the user requests the communication service of the operator to be updated/managed may be performed. Operation 809 may be performed before operation 801, and when operation 809 is performed before operation 801, operations 801 to 819 may be performed after operation 809.

In operation 811, the second operator application 235 may request the LPA 223 to start a command code procedure. In operation 811, the second operator application 235 may further transmit an indicator notifying that the command code procedure will use the unsigned command code. Operation 811 may be performed by using, for example, a command code procedure start (initiate LPA API) request message. Operation 811 may further include an operation by which the terminal 200 controls (access control) the second operator application 235 to access the LPA 223, according to an embodiment of the terminal. For example, the terminal 200 may control the access by the second operator application 235 to the LPA 223, by complexly using one or more of the methods of allowing the access to the LPA 223 for all types of applications, using the access control function provided by the OS of the terminal, identifying the software package name, developer information, or version information of the second operator application 235, and verifying the digital certificate used to sign the second operator application 235 or the hash operation result of the digital certificate. As described above, the operation of controlling the access by the second operator application 235 to the LPA 223 may be referred to as the local authorization verification or device internal authorization verification.

In operation 815, the LPA 223 may transmit, to the second operator application 235, a command code generation information (LPA API info). The command code generation information (LPA API info) may include at least one of information (eUICC info) of the eUICC 213 and information (device info) of the terminal. Operation 815 may be performed by using, for example, a command code procedure start (initiate LPA API) response message.

In operation 817, the second operator application 235 may request the second operator server 243 to generate a command code by transmitting the command code generation information (LPA API info).

In operation 819, the second operator server 243 may generate the command code by using the command code generation information (LPA API info) and the event ID (MatchingID).

In operation 833, the second operator server 243 may reply the second operator application 235 with the unsigned command code.

In operation 835, the second operator application 235 may transmit the unsigned command code to the LPA 223 to request performing of the command code. Operation 835 may be performed by using, for example, a command code execution (execute command code) request message. Operation 835 may further include an operation by which the terminal 200 controls (access control) the second operator application 235 to access the LPA 223, according to an embodiment of the terminal. For example, the terminal 200 may control the access by the second operator application 235 to the LPA 223, by complexly using one or more of the methods of allowing the access for all types of applications, using the access control function provided by the OS of the terminal, identifying the software package name, developer information, or version information of the second operator application 235, identifying whether the software package name, developer information, or version information of the second operator application 235 is included in an application list registered in the LPA 221 or the OS of terminal, and verifying the digital certificate used to sign the second operator application 235 or the hash operation result of the digital certificate. As described above, the operation of controlling the access by the second operator application 235 to the LPA 223 may be referred to as the local authorization verification or device internal authorization verification.

In operation 837, the LPA 223 may perform additional verification on the performing of the command code. Operation 837 may be, for example, local authorization verification that is same as or different from the local authorization verification performed in operation 835. According to an embodiment of the present disclosure, the additional verification of operation 837 may include at least a part of a verification operation of operation 835. For example, in operation 837, the terminal 200 may verify the command code by identifying whether the software package name, developer information, or version information of the second operator application 233 is included in the application list registered in the LPA 223 or the OS of the terminal. In order for the LPA 223 to perform the additional verification on the performing of the command code, operations by the user, first operator server 241, or second operator server 243 may be performed. In other words, operation 837 may further include the operations by the user, first operator server 241, or second operator server 243. Also, operation 837 may include, for example, an operation by which the terminal queries the user about an intention of performing (or executing) the command code, via a screen or voice, and asks for consent of the user. The operation by which the terminal asks for consent of the user may include receiving, from the user, an operation of the user selecting yes or no, inputting a set password, or inputting biometric information, such as a fingerprint or iris of the user. The terminal 200 may provide a user interface to the user, query the user about the intention of performing the command code according to the method described above via the user interface, and receive a response from the user. The user interface may be provided in various forms. For example, the user interface may be visually displayed or auditorily provided as sound, but is not limited thereto, and may be provided to the user according to various methods.

In operation 839, the LPA 223 may reply the second operator application 235 with a verification result of performing the command code. Operation 839 may be performed by using, for example, a command code execution (execute command code) response message.

When the local authorization verification and additional verification regarding the performing of the command code by the LPA 223 are successful in operation 835 and/or 837, the LPA 223 may generate a second token (eUICC Challenge, arbitrary character string) via the eUICC 213, in operation 841. Operation 841 may be performed by using, for example a eUICC character string generation (get eUICC challenge) request message and a eUICC character string generation (get eUICC challenge) response message.

In operation 843, the LPA 223 may request the second profile server 263 to perform the RSP operation by transmitting a part or all of information included in the command code or the token (euiccChallenge). Operation 843 may be performed by using, for example, at least one of an HTTPS/TLS connection, an authentication start (initiate authentication) message, a terminal authentication (authenticate client) message, or a profile package request (get bound profile package) message. Although not shown in FIG. 8, operation 843 may further include operations by the eUICC 213, first operator server 241, second operator server 243, first profile server 250, or second profile server 263. The token transmitted by the LPA 223 in operation 843 may be, for example, the second token (eUICC challenge) generated by the eUICC 213 in operation 841. Then, the second profile server 263 may reply the LPA 223 with all or a part of data required to perform the RSP operation. According to an embodiment of the present disclosure, the second profile server 263 may verify information included in the command code received from the LPA 223, and reply the LPA 223 with the all or part of the data required to perform the RSP operation, according to a result of the verification. The operation of verifying the information included in the command code may be, for example, an operation of determining whether the information included in the command code is identical to the event ID (MatchingID) stored in operation 803. The RSP operation of the terminal may include an operation related to RSP, such as an operation of downloading a profile or an operation of installing a profile. The data required to perform the RSP operation may include, for example, profile abstract information (profile metadata) or a remote management command (RPM package). According to an embodiment of the present disclosure, operation 841 may be omitted. For example, the LPA 223 may not generate the second token via the eUICC 213. Accordingly, the operation of transmitting or receiving the eUICC character string generation (get eUICC challenge) request message and the eUICC character string generation (get eUICC challenge) response message may be omitted. Also, in operation 843, the LPA 223 may not transmit the second token (euiccChallenge) to the second profile server 263.

Referring to FIG. 8, the terminal may process the command code generated by the second operator application 233 and second operator server 243, even for the eUICC 213 that is a v2 eUICC not supporting signature verification of the command code. Also, when the first profile server 240 did not limit the purpose of event ID in the command code during the operation of preparing the RSP operation (operation 801), the unsigned command code may be generated (operation 819) without the first profile server 250. Also, when the first operator server 241 has notified that the verification of the second token is not required (see operation 801), it is not required for the first profile server 250 to transmit the second token calculated by the eUICC 213 to the second profile server 263, and the second profile server 263 to perform an additional operation of verifying the token.

Figure 9:
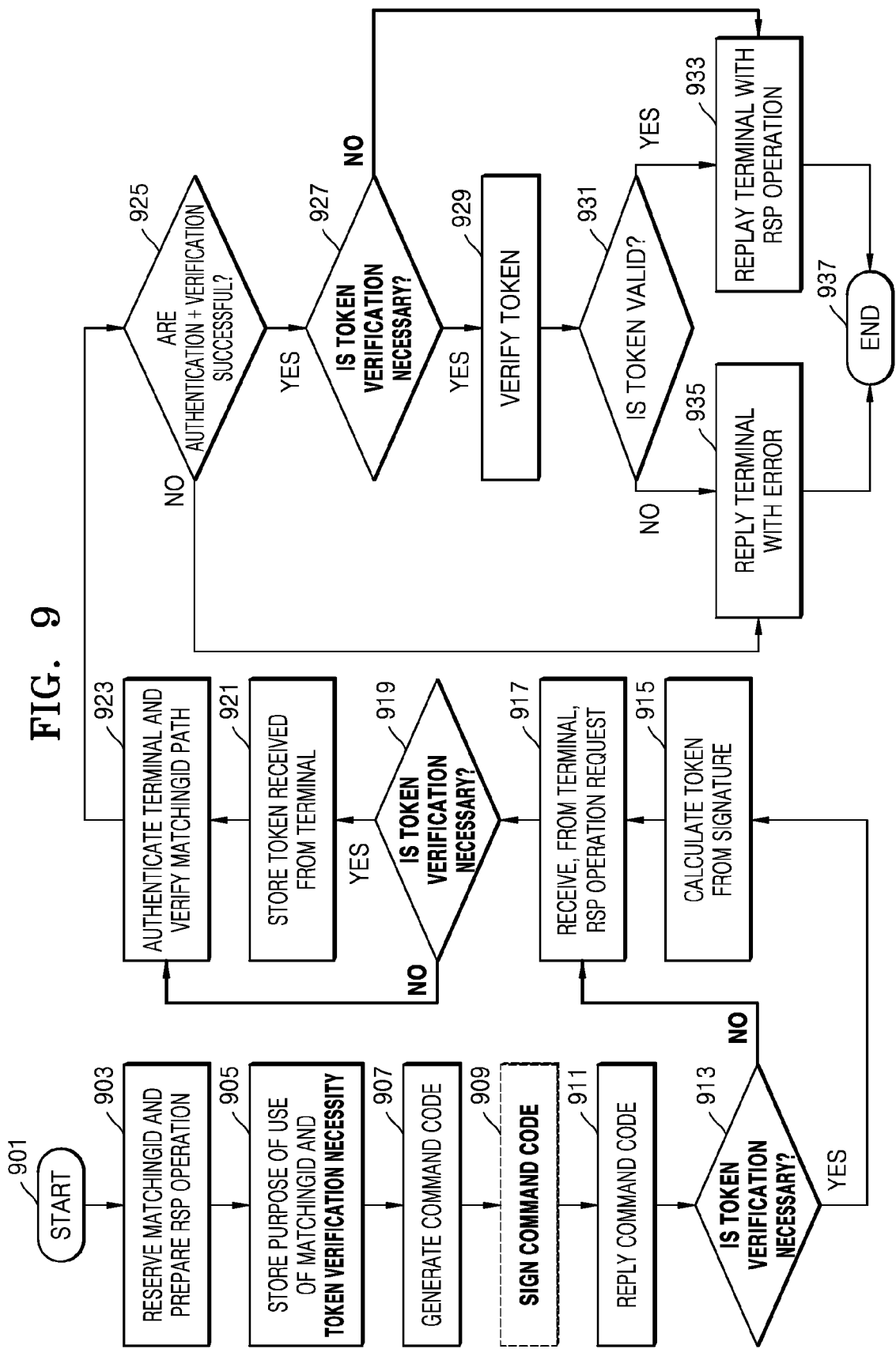
FIG. 9 is a flowchart of operations of a profile server, according to an embodiment of the present disclosure.

FIG. 9 is a flowchart of operations of a profile server, according to an embodiment of the present disclosure.

Each of profile servers (250, 251, 260, 261, 263, and those described without reference numerals) described in the present disclosure may correspond to the profile server described in FIG. 9.

Referring to FIG. 9, in operation 901, the profile server may start an operation.

In operation 903, the profile server may reserve an event ID and prepare an RSP operation. Operation 903 may be performed by a request of an operator server.

In operation 905, the profile server may store a purpose of use of the event ID and further store token verification necessity. Operation 905 may be performed by a request of the operator server.

In operation 907, the profile server may generate a command code. Operation 907 may be performed by a request of the operator server. Operation 907 may be performed by another profile server. For example, when operation 907 related to a first profile server is performed by a second profile server, the profile server may receive a command code from the second profile server that has generated the command code.

In operation 909, the profile server may generate a signature for the profile server. Operation 909 may be performed by a request of the operator server. When the operator server has requested to generate an unsigned command code, operation 909 may be omitted. Operation 909 may be performed by another profile server. For example, when operation 909 related to the first profile server is performed by the second profile server, the first profile server may receive a signed command code from the second profile server that has signed the command code.

In operation 911, the profile server may reply the command code. Operation 911 may be performed by another profile server. For example, when operation 911 related to the first profile server is performed by the second profile server, the first profile server may be notified of a command code reply result from the second profile server that replied with the command code. The command code may be replied to another server or a terminal. Operation 911 may correspond to operation 1011 of FIG. 10.

In operation 913, the profile server may determine whether token verification is necessary. Operation 913 may be performed by referring to the token verification necessity stored in operation 905. When the token verification is necessary, the profile server may perform operation 915. When the token verification is not necessary, the profile server may perform operation 917.

In operation 915, the profile server may calculate a token from the signature of the command code. Operation 915 may be performed by another profile server. For example, when operation 915 relates to the first profile server is performed by the second profile server, the first profile server may receive the token from the second profile server that performed the calculation of the token.

In operation 917, the profile server may receive, from the terminal, an RSP operation request. Operation 917 may correspond to operation 1023 of FIG. 10.

In operation 919, the profile server may determine whether the token verification is necessary. Operation 919 may be performed by referring to the token verification necessity stored in operation 905. When the token verification is necessary, the profile server may perform operation 921. When the token verification is not necessary, the profile server may perform operation 923.

In operation 921, the profile server may temporarily store the token received from the terminal. The token temporarily stored in operation 921 may be verified in operation 929.

In operation 923, the profile server may authenticate the terminal that requested the RSP operation and verify an event ID path notified by the terminal. Operation 923 may be performed by referring to the purpose of use of event ID stored in operation 905.

In operation 925, the profile server may determine whether the profile server has successfully authenticated the terminal and verified the event ID path in operation 923. When even one of the terminal authentication and the event ID path verification has failed, the profile server may perform operation 935. When both the terminal authentication and the event ID path verification are successful, the profile server may perform operation 927.

In operation 927, the profile server may determine whether the token verification is necessary. Operation 927 may be performed by referring to the token verification necessity stored in operation 905. When the token verification is necessary, the profile server may perform operation 929. When the token verification is not necessary, the profile server may perform operation 933.

In operation 929, the profile server may verify the token. Operation 929 may be an operation of verifying whether the token verification stored in operation 905 and the token calculated in operation 915 are related to a same token.

In operation 931, the profile server may determine whether the token verification by the profile server in operation 929 was successful. When the token is not valid, the profile server may perform operation 935. When the token is valid, the profile server may perform operation 933.

In operation 933, the profile server may reply the terminal with all or a part of data required by the terminal to perform the RSP operation. The data required to perform the RSP operation may include, for example, profile abstract information (profile metadata) or a remote management command (RPM package). Operation 933 may correspond to operation 1025 of FIG. 10.

In operation 935, the profile server may reply the terminal with an error message. Operation 935 may correspond to operation 1025 of FIG. 10.

In operation 937, the profile server may end the operation.

Figure 10:
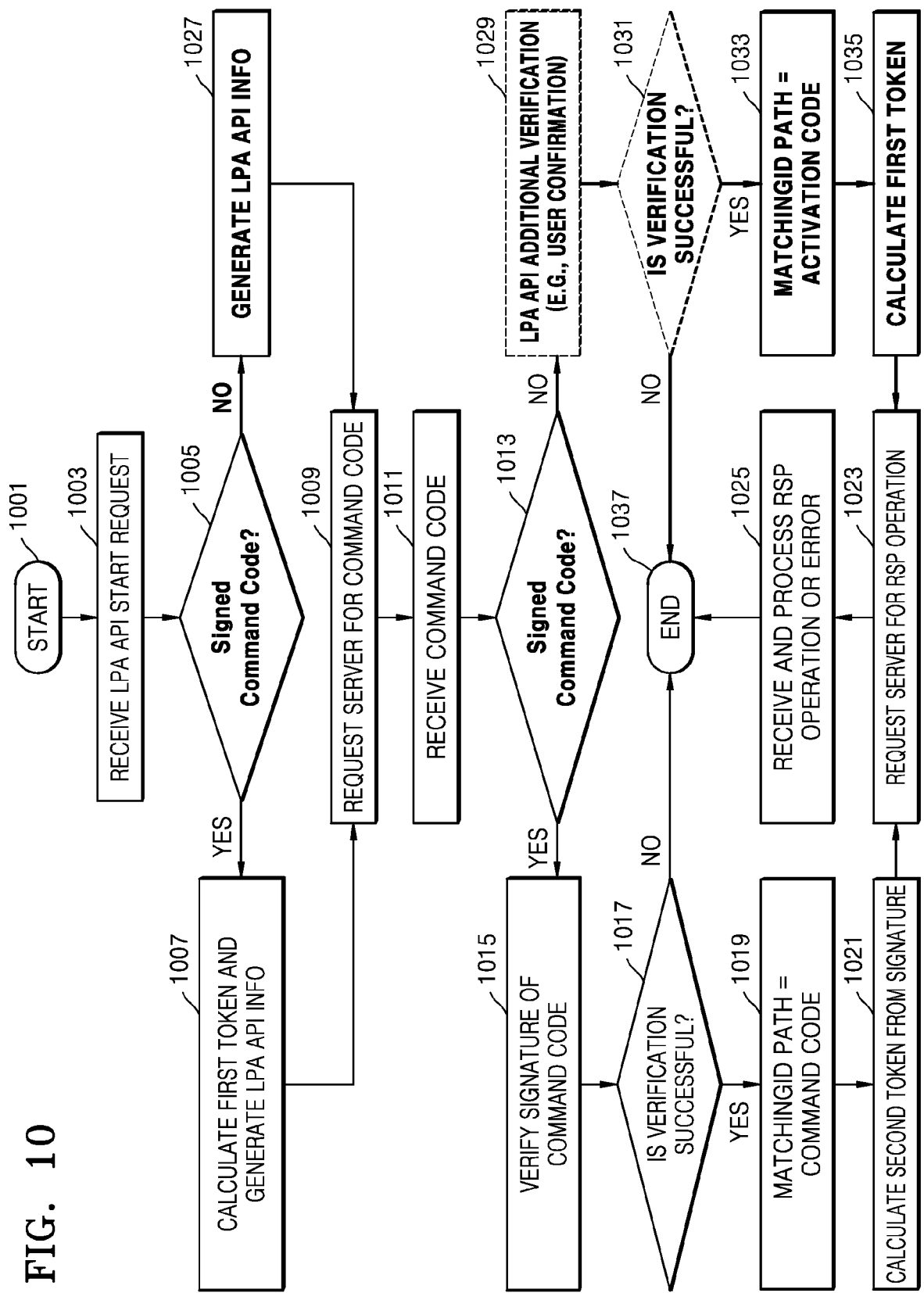
FIG. 10 is a flowchart of operations of a terminal, according to an embodiment of the present disclosure.

FIG. 10 is a flowchart of operations of a terminal, according to an embodiment of the present disclosure.

Each of terminals (110, 200, 2001, 2003, 2005, and those described without reference numerals) described in the present disclosure may correspond to the terminal described in FIG. 10.

Referring to FIG. 10, in operation 1001, the termina may start an operation.

In operation 1003, the terminal may receive a request to start a command code procedure. In other words, the terminal may receive a start request for the command code procedure. The start of the command code procedure may be requested by software installed in the terminal or a server outside the terminal. The software installed in the terminal may be, for example, an operator application. The server outside the terminal may be, for example, an operator server. The start request for the command code procedure may further include an indicator indicating whether the command code procedure is to be performed by using a signed command code or by using an unsigned command code.

In operation 1005, the terminal may determine whether to use the signed command code or the unsigned command code. Operation 1005 may be performed by referring to the indicator about the use of the signed command code and unsigned command code received in operation 1003. When the command code procedure is performed by using the signed command code, the terminal may perform operation 1007. When the command code procedure is performed by using the unsigned command code, the terminal may perform operation 1027.

In operation 1007, the terminal may calculate a first token and generate command code generation information for the signed command code. The command code generation information may include at least one of the first token, eUICC information (eUICC info), and terminal information (device info).

In operation 1009, the terminal may request the server for the command code. The server may be, for example, an operator server.

In operation 1011, the terminal may receive the command code from the server. Operation 1011 may correspond to operation 911 of FIG. 9.

In operation 1013, the terminal may determine whether to use the signed command code or the unsigned command code. Operation 1013 may be performed by referring to the indicator about the use of the signed command code and unsigned command code received in operation 1003, or by referring to whether the command code received in operation 1011 includes a signature. When the command code procedure is performed by using the signed command code, the terminal may perform operation 1015. When the command code procedure is performed by using the unsigned command code, the terminal may perform operation 1029. Alternatively, when the command code procedure is performed by using the unsigned command code and the terminal omits operations 1029 and 1031, the terminal may perform operation 1033.

In operation 1015, the terminal may verify the signature of the command code. The operation of the terminal verifying the signature of the command code may further include an operation of determining whether a digital certificate of a profile server included in the command code or stored in the terminal is valid, and an operation of determining whether a signature of the profile server is valid by using the digital certificate of the profile server.

In operation 1017, the terminal may determine whether the signature of the command code is valid. When the signature is valid, the terminal may perform operation 1019. When the signature is not valid, the terminal may perform operation 1037.

In operation 1019, the terminal may set an event ID path by using an indicator indicating the command code. The event ID path may be represented by, for example, the indicator indicating the command code.

In operation 1021, the terminal may calculate a second token from the signature of the command code.

In operation 1023, the terminal may request the server for an RSP operation. The server may be, for example, the profile server. Operation 1023 may correspond to operation 917 of FIG. 9.

In operation 1025, the terminal may receive, from the server, all or a part of data required for the RSP operation or an error message. The data required to perform the RSP operation may include, for example, profile abstract information (profile metadata) or a remote management command (RPM package). Operation 1025 may correspond to operation 933 or 935 of FIG. 9.

In operation 1027, the terminal may generate command code generation information for the unsigned command code. The command code generation information may include at least one of eUICC information (eUICC info) and terminal information (device info).

In operation 1029, the terminal may perform verification for processing the unsigned command code. Operation 1029 may further include, according to an embodiment of the terminal, an operation of the terminal controlling (access control) an access by an operator application to an LPA, or an operation of the terminal querying a user (not shown) about an intention of performing the command code via a screen or voice, and asking for consent of the user. The operation of the terminal controlling the access by the operator application to the LPA may be performed by, for example, complexly using one or more of methods of allowing an access for all types of applications, using an access control function provided by an OS of the terminal, identifying a software package name, developer information, or version information of the operator application, and verifying a digital certificate used to sign the operator application or a hash operation result of the digital certificate. The operation of the terminal asking for consent of the user may include receiving, from the user, an operation of the user simply selecting yes or no, inputting a set password, or inputting biometric information, such as a fingerprint or iris of the user. Operation 1029 may be selectively performed. In other words, operation 1029 may be omitted.

In operation 1031, the terminal may determine whether the verification for the process of the unsigned command code is successful. Operation 1031 may be selectively performed depending on whether operation 1029 has been performed. For example, when the terminal performs operation 1029, operation 1031 may also be performed. For example, when the terminal does not perform operation 1029, operation 1031 may also not be performed. When the verification for the process of the unsigned command code is successful, the terminal may perform operation 1033. When the verification for the process of the unsigned command code fails, the terminal may perform operation 1037.

In operation 1033, the terminal may set the event ID path by using an indicator indicating an activation code. The event ID path may be represented by, for example, the indicator indicating the command code.

In operation 1035, the terminal may calculate the first token. The terminal may perform operation 1023 after calculating the first token.

In operation 1037, the terminal may end the operation.

Figure 11:
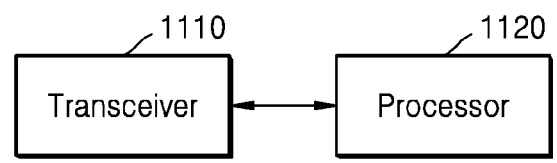
FIG. 11 is a block diagram showing components of profile server, according to an embodiment of the present disclosure.

FIG. 11 is a block diagram showing components of profile server, according to an embodiment of the present disclosure.

Each of profile servers (250, 251, 260, 261, 263, and those described without reference numerals) described in the present disclosure may correspond to the profile server described in FIG. 11. For example, the profile server of FIG. 11 may be the first profile server 250 or second profile server 260 of FIG. 2A.

Referring to FIG. 11, the profile server may include a transceiver 1110 and a processor 1120.

The transceiver 1110 may transmit or receive a signal, information, or data to or from a terminal or an operator.

The transceiver 1110 according to an embodiment of the present disclosure may receive an RSP operation preparation request from the operator, transmit an identifier corresponding to an RSP operation to the operator, receive a command code generation request from the operator, transmit a command code to the operator, selectively transmit a token to another profile server, receive an RSP operation request message from the terminal, and transmit a part or all of the RSP operation to the terminal.

Meanwhile, the processor 1120 is a component for controlling the profile server in general. The processor 1120 may control an overall operation of the profile server, according to various embodiments of the present disclosure. The processor 1120 may be referred to as a control unit. According to an embodiment of the present disclosure, the processor 1120 may include at least one processor.

The processor 1120 according to an embodiment of the present disclosure may control the profile server to receive the RSP operation preparation request from the operator, prepare for the RSP operation, identify an event ID corresponding to the RSP operation, store whether token verification is necessary for future vent processing, store an event ID path for the future event processing, transmit the event ID to the operator, receive the command code generation request from the operator, selectively sign the command code according to a request of the operator, transmit the command code to the operator, determine whether the token verification is necessary, when the token verification is necessary, calculate a token from the signature or receive the token from another server, receive the RSP operation request message from the terminal, determine whether the token verification is necessary, when the token verification is necessary, temporarily store a token received from the terminal, authenticate the terminal, verify the event ID path, verify the token when the token verification is necessary, transmit a part or all of the RSP operation to the terminal when the terminal authentication, event ID path verification, and token verification are all successful, and transmit an error code to the terminal when even one of the terminal authentication, event ID path verification, and token verification fails.

The profile server may further include a memory (not shown) and may store data, such as a base program, an application program, configuration information, or the like for operations of the profile server. The memory may include at least one storage medium from among a flash memory type, a hard disk type, a multimedia card micro type, a card type memory (for example, a secure digital (SD) or extreme digital (XD) memory), a magnetic memory, a magnetic disk, an optical disk, random-access memory (RAM), static random-access memory (SRAM), read-only memory (ROM), programmable read-only memory (PROM), and electrically erasable programmable read-only memory (EEPROM). Also, the processor 1120 may perform various operations by using various programs, content, and data stored in the memory.

Figure 12:
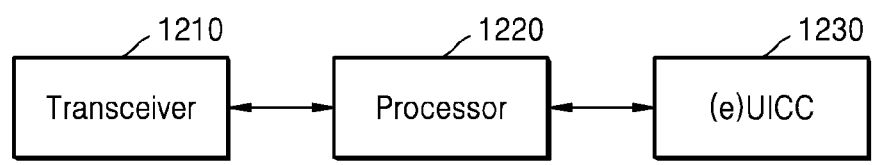
FIG. 12 is a block diagram showing components of a terminal, according to an embodiment of the present disclosure.

FIG. 12 is a block diagram showing components of a terminal, according to an embodiment of the present disclosure.

Each of terminals (110, 200, 2001, 2003, 2005, and those described without reference numerals) described in the present disclosure may correspond to the terminal described in FIG. 12. For example, the terminal of FIG. 12 may be the terminal 200 of FIG. 2A.

As shown in FIG. 12, the terminal may include a transceiver 1210 and a processor 1220. Also, the terminal may include a UICC 1230. For example, the UICC 1230 may be inserted into the terminal or may be a eUICC embedded in the terminal.

The transceiver 1110 may transmit or receive a signal, information, or data to or from an operator server or a profile server.

According to an embodiment of the present disclosure, the transceiver 1210 may receive a command code procedure start request message from the operator server, transmit a message requesting the operator server to generate a command code, receive the command code from the operator server, transmit a message requesting an RSP operation to the profile server, and receive a part or all of the RSP operation from the profile server.

Meanwhile, the processor 1220 is a component for controlling the terminal in general. The processor 1220 may control an overall operation of the terminal, according to various embodiments of the present disclosure. The processor 1220 may be referred to as a control unit. According to an embodiment of the present disclosure, the processor 1220 may include at least one processor.

The processor 1220 according to an embodiment of the present disclosure may control the terminal to receive the command code procedure start request message from the operator server, determine whether to use a signed command code, generate a first token when the signed command code is used, prepare information required for command code generation, transmit a message requesting to generate a command code to the operator server, receive the command code from the operator server, determine whether the command code has been signed, generate a second token by verifying the signature when the command code has been signed, generate the first token when the command code has not been signed, generate an RSP operation request message including at least one of the first token and/or the second token and a part or all of the command code, transmit the RSP operation request message to the profile server, receive a part or all of an RSP operation from the profile server, and perform the RSP operation.

The UICC 1230 according to an embodiment of the present disclosure may download a profile and install the profile. Also, the UICC 1230 may manage the profile.

The UICC 1230 may operate under control by the processor 1220. Alternatively, the UICC 1230 may include a processor or controller for installing the profile, or may be installed with an application. A part of the application may be installed in the processor 1220.

The terminal may further include a memory (not shown) and may store data, such as a base program, an application program, configuration information, or the like for operations of the terminal. The memory may include at least one storage medium from among a flash memory type, a hard disk type, a multimedia card micro type, a card type memory (for example, a secure digital (SD) or extreme digital (XD) memory), a magnetic memory, a magnetic disk, an optical disk, random-access memory (RAM), static random-access memory (SRAM), read-only memory (ROM), programmable read-only memory (PROM), and electrically erasable programmable read-only memory (EEPROM). Also, the processor 1220 may perform various operations by using various programs, content, and data stored in the memory.

According to an embodiment of the present disclosure, in a wireless communication system, the terminal may receive, from a first server (or the operator server), a command code including event download information for downloading an event related to the profile. Also, the terminal may perform verification for processing the command code and when the verification is successful, generate a message requesting downloading of the event by using the event download information and transmit the message to a second server (or the profile server). Also, the terminal may receive, from the second server, the event in response to the message requesting the downloading of the event.

According to an embodiment of the present disclosure, in the wireless communication system, the first server (or operator server) may obtain event identification information corresponding to the event related to the profile to be provided to the terminal, and generate the command code including the event download information for the terminal to download the event, based on the event identification information. Also, the first server may transmit, to the terminal, a signed command code in which a signature is added to the command code, or an unsigned command code in which the command code is not signed.

According to an embodiment of the present disclosure, in the wireless communication system, the second server (or profile server) may obtain the event related to the profile to be provided to the terminal, and the event identification information corresponding to the event. Also, the second server may receive, from the terminal, the message requesting for the downloading of the event in response to the command code obtained by the terminal, verify the message based on the event identification information, and transmit the event to the terminal when the verification is successful.

Figure 13:
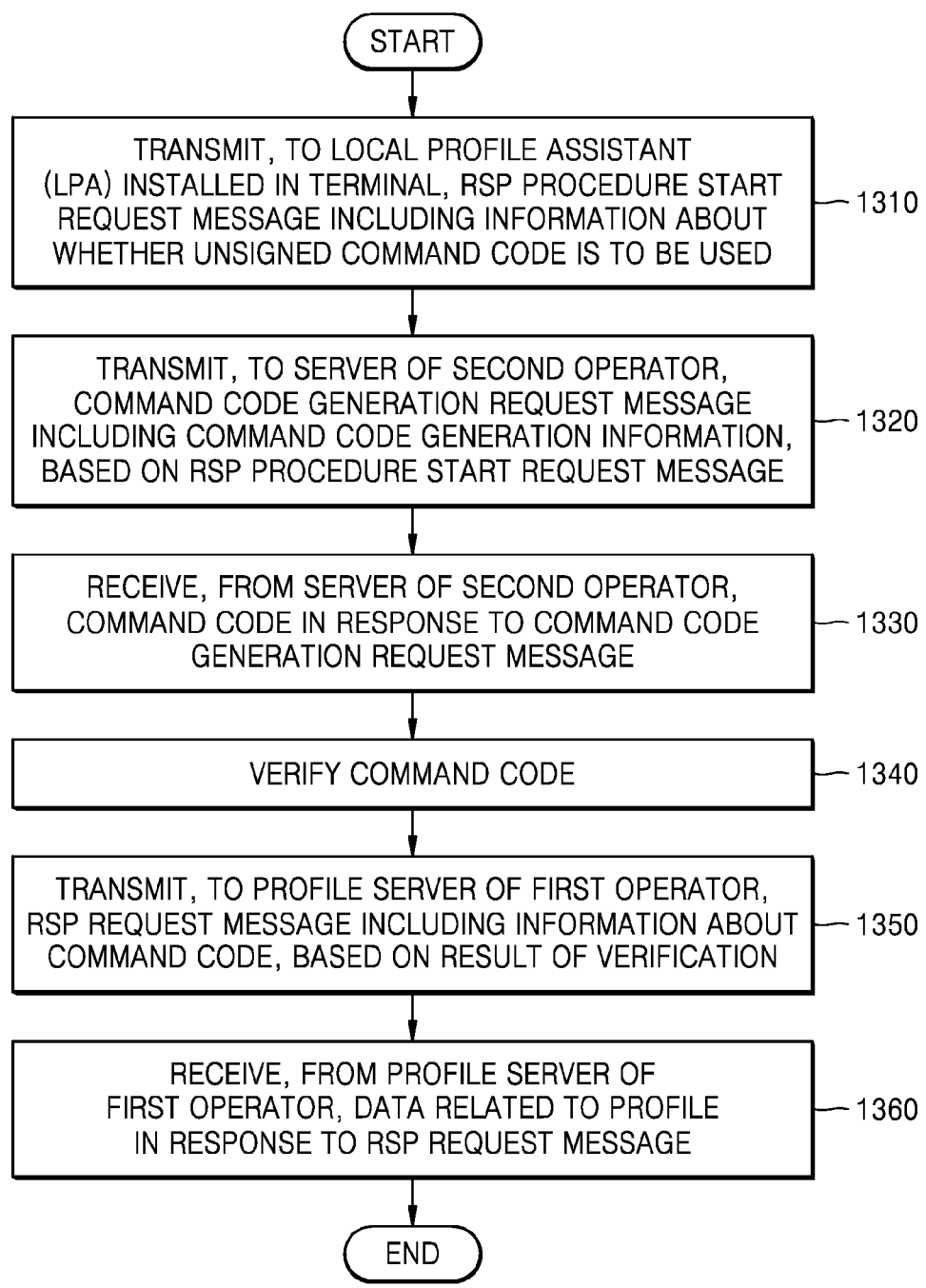
FIG. 13 is a flowchart for describing operations of a terminal, according to an embodiment of the present disclosure.

FIG. 13 is a flowchart for describing operations of a terminal, according to an embodiment of the present disclosure.

Referring to FIG. 13, in operation 1310, the terminal according to an embodiment of the present disclosure may transmit, to a local profile assistant (LPA) installed in the terminal, an RSP procedure start request message including information about whether an unsigned command code is to be used.

In operation 1320, the terminal according to an embodiment of the present disclosure may transmit, to a server of a second operator, a command code generation request message including command code generation information, based on the RSP procedure start request message.

In operation 1330, the terminal according to an embodiment of the present disclosure may receive, from the server of the second operator, a command code in response to the command code generation request message.

In operation 1340, the terminal according to an embodiment of the present disclosure may verify the command code.

In operation 1350, the terminal according to an embodiment of the present disclosure may transmit, to a profile server of a first operator, an RSP request message including information about the command code, based on a result of the verification.

In operation 1360, the terminal according to an embodiment of the present disclosure may receive, from the profile server of the first operator, data related to a profile in response to the RSP request message.

Figure 14:
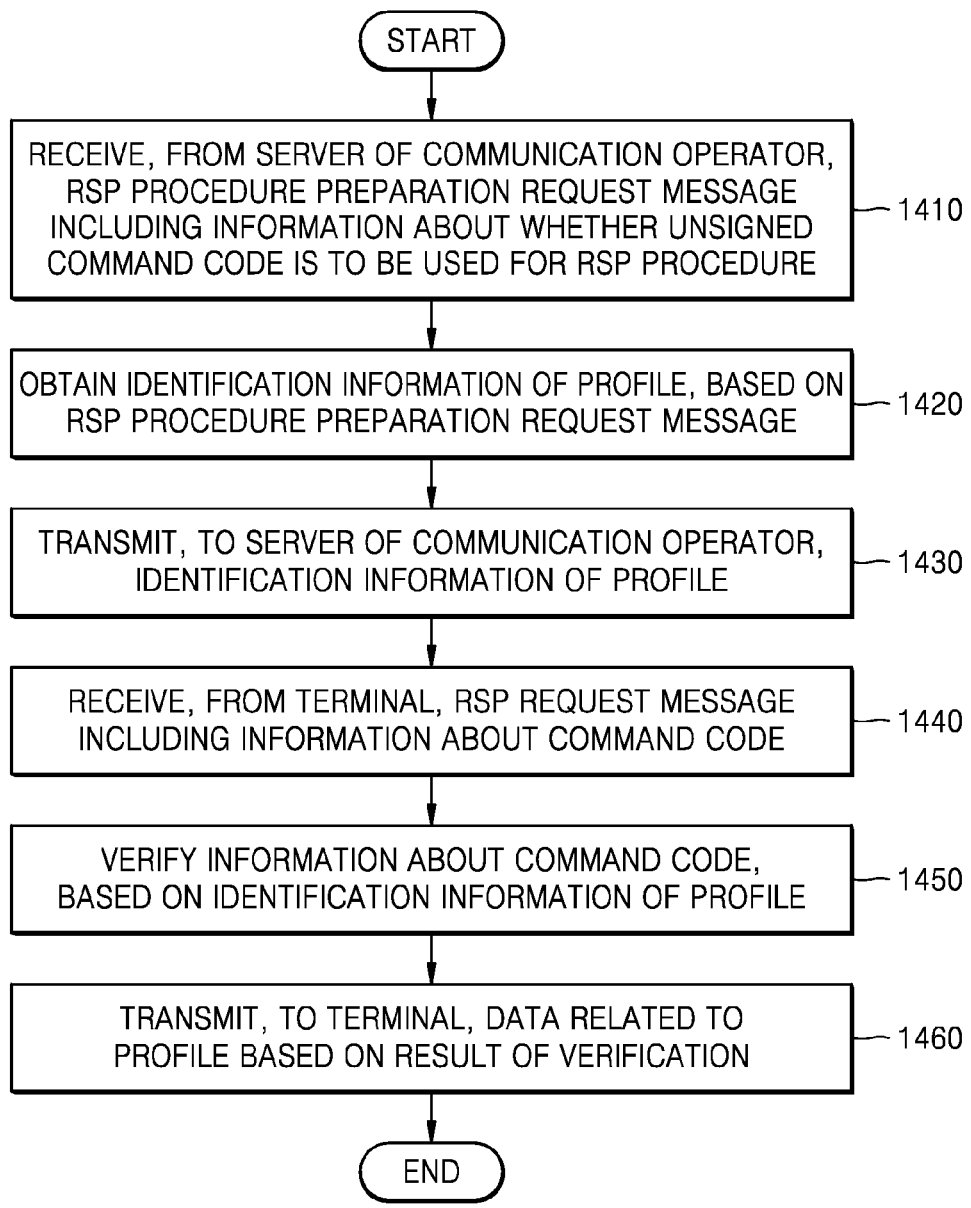
FIG. 14 is a flowchart for describing operations of a profile server, according to an embodiment of the present disclosure.

FIG. 14 is a flowchart for describing operations of a profile server, according to an embodiment of the present disclosure.

Referring to FIG. 14, in operation 1410, the profile server according to an embodiment of the present disclosure may receive, from a server of a communication operator, an RSP procedure preparation request message including information about whether an unsigned command code is to be used for an RSP procedure.

In operation 1420, the profile server according to an embodiment of the present disclosure may obtain identification information of a profile, based on the RSP procedure preparation request message.

In operation 1430, the profile server according to an embodiment of the present disclosure may transmit the identification information of the profile to the server of the communication operator.

In operation 1440, the profile server according to an embodiment of the present disclosure may receive, from a terminal, an RSP request message including information about a command code.

In operation 1450, the profile server according to an embodiment of the present disclosure may verify the information about the command code, based on the identification information of the profile.

In operation 1460, the profile server according to an embodiment of the present disclosure may transmit, to the terminal, data related to the profile, based on a result of the verification.

Details described with reference to FIGS. 1 through 12 may be inferred and applied to details about the operations described in FIGS. 13 and 14.

In the afore-described embodiments of the present disclosure, elements included in the present disclosure are expressed in a singular or plural form according to specific embodiments. However, the singular or plural form is appropriately selected for convenience of explanation and the present disclosure is not limited thereto. As such, an element expressed in a plural form may also be configured as a single element, and an element expressed in a singular form may also be configured as plural elements.

Meanwhile, specific embodiments have been described in the detailed description of the present disclosure, but various modifications may be possible without departing from the scope of the present disclosure. Therefore, the scope of the present disclosure should not be limited to the embodiments described above, but should be determined not only by the scope of the following claims, but also by the equivalents of the claims.

It should be understood that the various embodiments of the present disclosure and the terms used herein are not intended to limit the techniques described in the present disclosure to specific embodiments, and include various modifications, equivalents, and/or alternatives of corresponding embodiments. In relation to the description of drawings, like reference numerals may denote like elements. An expression used in the singular may encompass the expression in the plural, unless it has a clearly different meaning in the context. In the present disclosure, the expression such as "A or B", "at least one of A and/or B", "A, B, or C", or "at least one of A, B, and/or C", include all possible combinations of listed elements. Expressions such as "first", "second", and the like may modify corresponding elements regardless of their order or importance, and are merely used to distinguish one element from another and do not limit the corresponding elements. When an element (for example, a first element) is "(functionally or communicably) connected" or "accessed" to another element (for example, a second element), the element may be connected to the other element directly or via another element (for example, a third element).

The term "module" used in the present disclosure includes a unit consisting of hardware, software, or firmware, and for example, may be interchangeably used with the term such as logic, a logical block, a component, or a circuit. The module may be an integrally configured component, a minimum unit performing one or more functions, or a part thereof. For example, the module may be configured as an application-specific integrated circuit (ASIC).

Various embodiments of the present disclosure may be implemented as a machine (for example, computer)—readable storage media (for example, software including instructions stored in an internal memory or external memory (for example, a program). A machine is an apparatus for invoking stored instructions from a storage medium and operating according to the invoked instructions, and may include a terminal (for example, the terminal 200, the first terminal 2001, the second terminal 2003, or the third terminal 2005), according to various embodiments of the present disclosure. When the instruction is executed by a processor (for example, the processor 1120 or FIG. 11 or the processor 1220 of FIG. 12), the processor may perform a function corresponding to the instruction directly or by using other components under control thereof. The instruction may include code generated or executed by a compiler or interpreter.

The machine-readable storage medium may be provided in the form of a non-transitory storage medium. The term "non-transitory" only means that a storage medium does not include a signal and is tangible, and does not distinguish whether data is stored in the storage medium semi-permanently or temporarily.

A method according to various embodiments of the present disclosure may be provided by being included in a computer program product. The computer program products are products that can be traded between sellers and buyers. The computer program product may be distributed in a form of machine-readable storage medium (for example, a compact disc read-only memory (CD-ROM)), or distributed through an application store (for example, Play Store) online. In the case of online distribution, at least a part of the computer program product may be temporarily stored or temporarily generated in the storage medium such as a server of a manufacturer, a server of an application store, or a memory of a relay server.

Each of components (e.g., modules or programs) according to the various embodiments may include a single or plurality of entities, and some sub-components among the above-described sub-components may omitted, or other sub-components may be further included in various embodiments. Alternatively or additionally, some components (e.g., modules or programs) may be integrated into one entity, and functions performed by each component prior to the integration may be performed identically or similarly. Operations performed by modules, programs, or other components, according to various embodiments, may be sequentially, parallel, repetitively or heuristically executed, at least some operations may be executed in a different order or omitted, or other operations may be added.

The invention claimed is:

1. A method performed by a terminal in a wireless communication system, the method comprising:
   transmitting, to a local profile assistant (LPA), a remote subscriber identity module provisioning (RSP) procedure start request message including information associated with an unsigned command code;
   transmitting, to a server of a first operator, a command code generation request message including information related to a command code generation;
   receiving, from the server of the first operator, a command code;
   verifying the command code;
   transmitting, to a profile server of a second operator, an RSP request message including information associated with the command code, based on a verification; and
   receiving, from the profile server of the second operator, data related to a profile.

2. The method of claim 1, wherein the information related to the command code generation comprises at least one of information related to the terminal or information related to an embedded universal integrated circuit card (eUICC) of the terminal.

3. The method of claim 1, wherein the command code is generated, by the server of the first operator, based on identification information of the profile received from a server of the second operator.

4. The method of claim 1, wherein the verifying of the command code comprises:
   receiving, from a user of the terminal, an input related to execution of the command code; and
   verifying the command code, based on the input.

5. The method of claim 1, wherein the receiving of, from the server of the first operator, the command code comprises receiving the command code from the server of the first operator, by using an application of the first operator installed in the terminal, and
   wherein the verifying of the command code comprises:
      verifying an access authority of the application of the first operator to access the LPA;
      transmitting, from the application of the first operator to the LPA, the command code, based on a verification of the access authority; and
      verifying the command code by using the LPA.

6. The method of claim 1, wherein the information associated with the unsigned command code includes an indicator indicating that the unsigned command code is to be used for the RSP procedure, and
   wherein the command code received from the server of the first operator is the unsigned command code.

7. A terminal in a wireless communication system, the terminal comprising:
   a transceiver; and
   at least one processor configured to:
      transmit, to a local profile assistant (LPA), a remote subscriber identity module provisioning (RSP) procedure start request message including information associated with an unsigned command code;
      control the transceiver to transmit, to a server of a first operator, a command code generation request message including information related to a command code generation;
      control the transceiver to receive, from the server of the first operator, a command code;
      verify the command code;
      control the transceiver to transmit, to a profile server of a second operator, an RSP request message including information associated with the command code, based on a verification; and
      control the transceiver to receive, from the profile server of the second operator, data related to a profile.

8. The terminal of claim 7, wherein the at least one processor is further configured to:
   control the transceiver to receive, from a user of the terminal, an input related to execution of the command code; and
   verify the command code based on the input.

9. The terminal of claim 7, wherein the at least one processor is further configured to:
   control the transceiver to receive the command code from the server of the first operator, by using an application of the first operator installed in the terminal;
   verify an access authority of the application of the first operator to access the LPA;
   transmit, from the application of the first operator to the LPA, the command code, based on a verification of the access authority; and
   verify the command code based on the LPA.

10. The terminal of claim 7, wherein the information associated with the unsigned command code includes an indicator indicating that the unsigned command code is to be used for the RSP procedure, and
   wherein the command code received from the server of the first operator is the unsigned command code.

* * * * *